US012533114B2

(12) United States Patent
Horiuchi et al.

(10) Patent No.: US 12,533,114 B2
(45) Date of Patent: Jan. 27, 2026

(54) IMAGE PROCESSING APPARATUS, IMAGE CAPTURING SYSTEM, IMAGE PROCESSING METHOD, AND IMAGE PROCESSING PROGRAM

(71) Applicant: FUJIFILM Corporation, Tokyo (JP)

(72) Inventors: Hisatsugu Horiuchi, Kanagawa (JP); Atsushi Osawa, Kanagawa (JP); Keiji Tsubota, Kanagawa (JP); Takeyasu Kobayashi, Kanagawa (JP); Sayaka Saito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 24 days.

(21) Appl. No.: 18/589,361

(22) Filed: Feb. 27, 2024

(65) Prior Publication Data

US 2024/0299012 A1    Sep. 12, 2024

(30) Foreign Application Priority Data

Mar. 9, 2023    (JP) .................................. 2023-036995

(51) Int. Cl.
*A61B 8/00* (2006.01)
*A61B 6/00* (2006.01)
*A61B 6/04* (2006.01)
*A61B 6/50* (2024.01)
*A61B 8/08* (2006.01)
(Continued)

(52) U.S. Cl.
CPC .......... *A61B 8/5261* (2013.01); *A61B 6/0414* (2013.01); *A61B 6/502* (2013.01); *A61B 6/547* (2013.01); *A61B 8/0825* (2013.01); *A61B 8/4254* (2013.01); *G06T 3/02* (2024.01); *G06T 11/005* (2013.01); *G06T 2210/41* (2013.01)

(58) Field of Classification Search
CPC ... A61B 8/5261; A61B 8/0825; A61B 8/4254; A61B 6/0414; A61B 6/502; A61B 6/547; G06T 3/02; G06T 11/005; G06T 2210/41
See application file for complete search history.

(56) References Cited

U.S. PATENT DOCUMENTS 8,475,376 B2 *   7/2013  Mikami ............... A61B 8/0825
                                                  600/407
2002/0156365 A1 * 10/2002  Tsekos ................... A61B 5/708
                                                  600/417

(Continued)

FOREIGN PATENT DOCUMENTS

JP    2009-028381 A    2/2009
JP    2012-170718 A    9/2012

*Primary Examiner* — Dixomara Vargas
(74) *Attorney, Agent, or Firm* — Studebaker Brackett PLLC

(57) ABSTRACT

An image processing apparatus includes at least one processor, and the processor is configured to: acquire a radiation image and a plurality of continuously captured ultrasound images while a breast is kept in a compression state by a compression member; acquire correction information related to at least one of a tilt of a probe that has performed scanning on the compression member during the capturing of the plurality of ultrasound images or a deflection of the compression member; generate a corrected ultrasound image corrected based on the correction information from the plurality of acquired ultrasound images; and associate the corrected ultrasound image with the radiation image.

15 Claims, 15 Drawing Sheets

(51) Int. Cl.
*G06T 3/02* (2024.01)
*G06T 11/00* (2006.01)

(56) References Cited

U.S. PATENT DOCUMENTS

| | | | | |
|---|---|---|---|---|
| 2010/0030078 | A1* | 2/2010 | Mikami | A61B 6/4417 |
| | | | | 600/443 |
| 2010/0312113 | A1* | 12/2010 | Ogasawara | A61B 8/488 |
| | | | | 600/443 |
| 2011/0224550 | A1* | 9/2011 | Shinohara | A61B 8/4245 |
| | | | | 600/443 |
| 2011/0301465 | A1* | 12/2011 | Waki | A61B 8/08 |
| | | | | 600/445 |
| 2012/0029358 | A1* | 2/2012 | Lin | A61B 8/0825 |
| | | | | 600/447 |
| 2013/0109963 | A1* | 5/2013 | Zhu | A61B 5/7235 |
| | | | | 600/427 |
| 2013/0167648 | A1* | 7/2013 | Tokita | G01N 29/24 |
| | | | | 73/655 |
| 2014/0051969 | A1* | 2/2014 | Suzuki | A61B 8/403 |
| | | | | 600/407 |
| 2016/0018520 | A1* | 1/2016 | Hirai | G01S 15/8977 |
| | | | | 367/11 |
| 2016/0135688 | A1* | 5/2016 | Ebisawa | A61B 8/0825 |
| | | | | 600/407 |
| 2017/0049331 | A1* | 2/2017 | Suzuki | A61B 5/4887 |
| 2018/0263685 | A1* | 9/2018 | Onik | A61B 18/1477 |
| 2019/0150895 | A1* | 5/2019 | Tian | A61B 8/4209 |
| 2021/0100530 | A1* | 4/2021 | Park | A61B 5/004 |
| 2022/0047160 | A1* | 2/2022 | Yoo | A61B 5/0823 |
| 2022/0409183 | A1* | 12/2022 | Ebata | A61B 8/5223 |
| 2024/0081783 | A1* | 3/2024 | Ebata | A61B 8/465 |

\* cited by examiner

FIG. 8
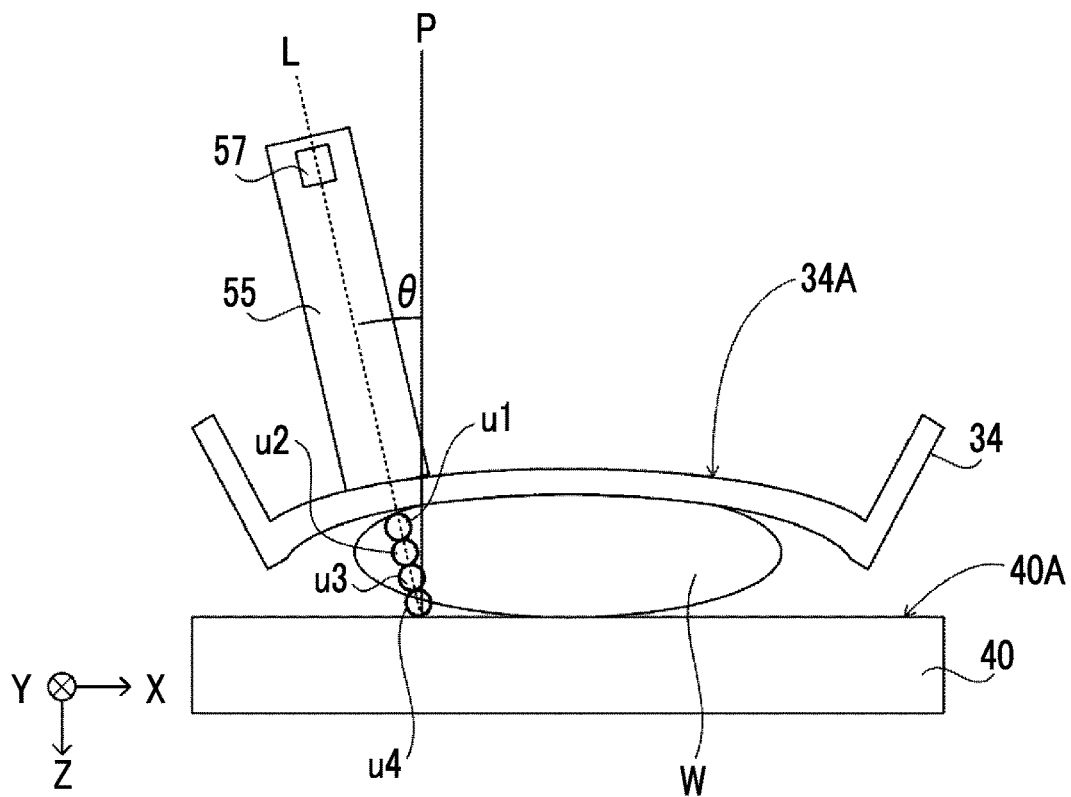
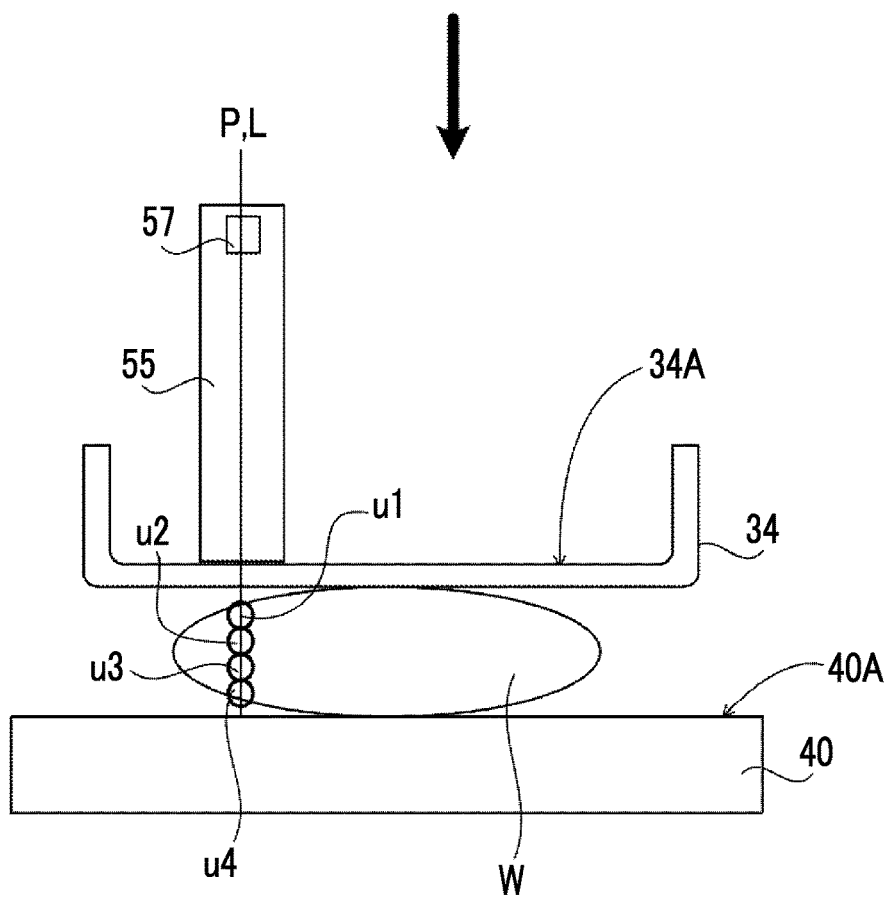

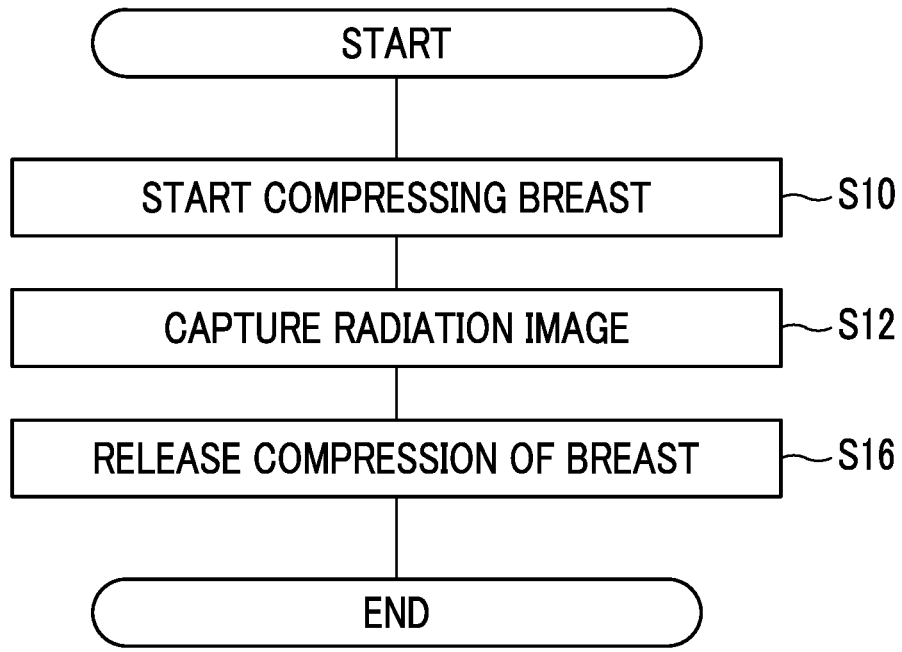
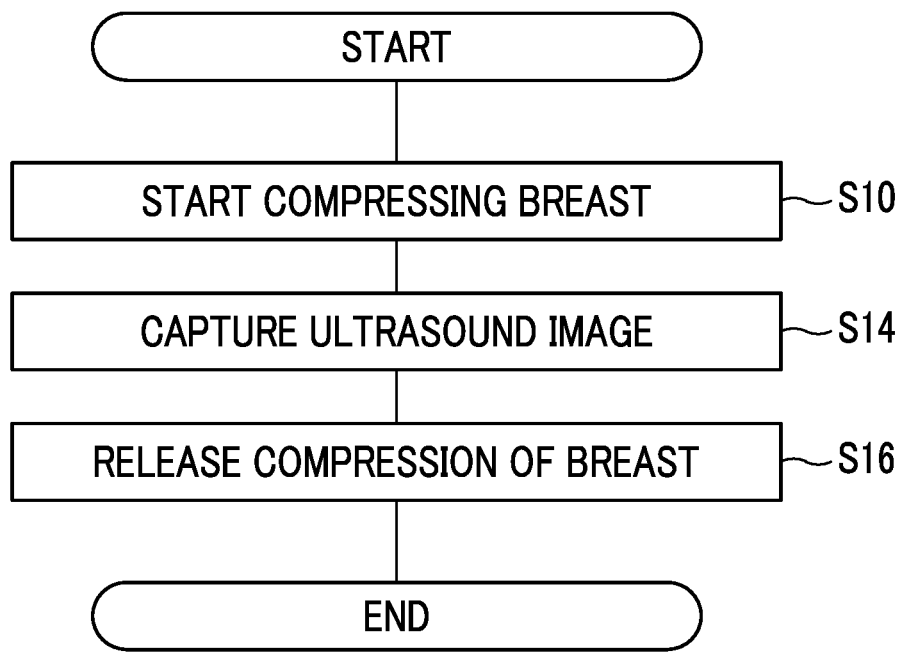

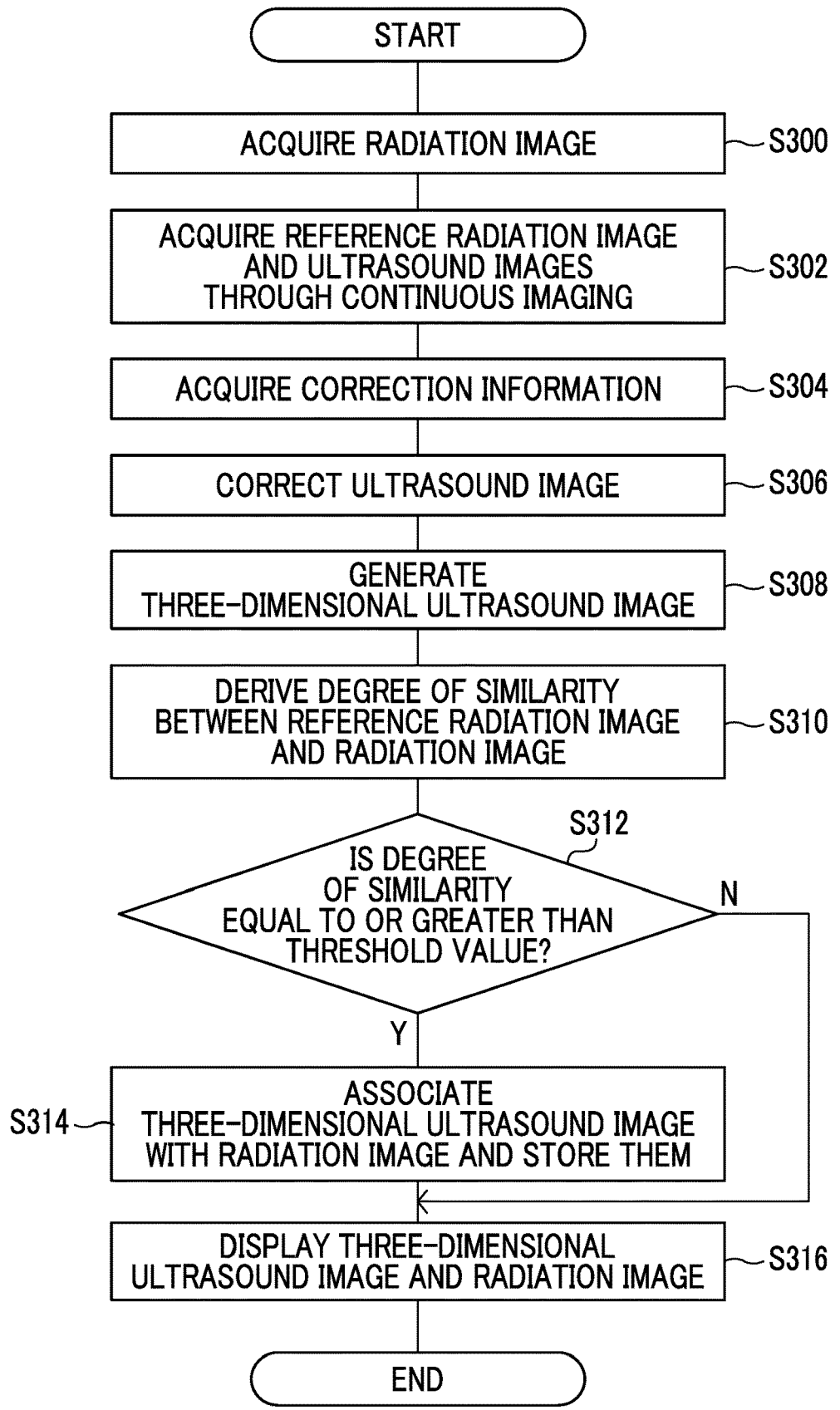

IMAGE PROCESSING APPARATUS, IMAGE CAPTURING SYSTEM, IMAGE PROCESSING METHOD, AND IMAGE PROCESSING PROGRAM

CROSS REFERENCE TO RELATED APPLICATIONS

This application claims priority from Japanese Application No. 2023-036995, filed on Mar. 9, 2023, the entire disclosure of which is incorporated herein by reference.

BACKGROUND

1. Technical Field

The present disclosure relates to an image processing apparatus, an image capturing system, an image processing method, and a non-transitory storage medium storing an image processing program.

2. Related Art

A radiography apparatus is known that irradiates a subject, such as the breast of an examinee, with radiation emitted from a radiation source and detects the radiation transmitted through the subject with a radiation detector to capture a radiation image.

Further, an ultrasonography apparatus is known that captures an ultrasound image of the breast by causing an ultrasound probe to perform scanning along the breast of the examinee to scan the breast with ultrasound.

JP2009-28381A and JP2012-170718A disclose apparatuses that can capture both a radiation image and an ultrasound image of the breast. In JP2009-28381A and JP2012-170718A, the radiation image and the ultrasound image are captured in a state in which the breast is compressed.

Interpretation may be performed while comparing a radiation image and an ultrasound image of the breast imaged in a compression state by a compression member. However, it may not be easy to compare the radiation image and the ultrasound image captured using the related art even in a case in which the compression states of the breast are the same.

SUMMARY

The present disclosure has been made in consideration of the above-mentioned circumstances, and an object of the present disclosure is to provide an image processing apparatus, an image capturing system, an image processing method, and a non-transitory storage medium storing an image processing program that can easily compare a radiation image and an ultrasound image of a breast imaged in a compression state.

In order to achieve the above object, according to a first aspect of the present disclosure, there is provided an image processing apparatus comprising at least one processor, in which the processor is configured to: acquire a radiation image and a plurality of continuously captured ultrasound images while a breast is kept in a compression state by a compression member; acquire correction information related to at least one of a tilt of a probe that has performed scanning on the compression member during the capturing of the plurality of ultrasound images or a deflection of the compression member; generate a corrected ultrasound image corrected based on the correction information from the plurality of acquired ultrasound images; and associate the corrected ultrasound image with the radiation image.

According to a second aspect of the present disclosure, in the image processing apparatus according to the first aspect, the processor may be configured to acquire a detection result of a sensor that detects at least one of the tilt of the probe or the deflection of the compression member as the correction information.

According to a third aspect of the present disclosure, in the image processing apparatus according to the second aspect, the sensor may be a sensor provided on the probe for detecting the tilt of the probe.

According to a fourth aspect of the present disclosure, in the image processing apparatus according to the third aspect, the sensor may be any of a magnetic sensor, a gyro sensor, or an acceleration sensor.

According to a fifth aspect of the present disclosure, in the image processing apparatus according to the second aspect, the sensor may be a sensor that detects a distance between the compression member and a predetermined position.

According to a sixth aspect of the present disclosure, in the image processing apparatus according to the fifth aspect, the sensor may be at least one of a TOF camera, a 3D camera, or a laser distance measurement device.

According to a seventh aspect of the present disclosure, in the image processing apparatus according to the first aspect, the correction information may include a thickness and a width of the breast in the compression state and a pressure for compressing the breast, and the processor may be configured to generate the corrected ultrasound image from the plurality of ultrasound images corrected based on the deflection of the compression member specified based on correspondence relationship information indicating a correspondence relationship among the width or the width and the thickness of the breast in the compression state, the pressure for compressing the breast, and information indicating the deflection of the compression member.

According to an eighth aspect of the present disclosure, in the image processing apparatus according to the first aspect, the processor may be configured to correct coordinates of each of the plurality of ultrasound images based on the correction information, and then generate a three-dimensional ultrasound image as the corrected ultrasound image through reconstruction.

According to a ninth aspect of the present disclosure, in the image processing apparatus according to the eighth aspect, the processor may be configured to perform affine transformation on each of the plurality of ultrasound images based on a deflection angle of the compression member at an imaging position of each of the plurality of ultrasound images, the deflection angle being obtained based on the correction information.

According to a tenth aspect of the present disclosure, in the image processing apparatus according to the ninth aspect, the correction information may include information indicating each of a width and a thickness of the breast in the compression state and a pressure for compressing the breast, and the processor may be configured to derive the deflection angle from the correction information.

According to an eleventh aspect of the present disclosure, in the image processing apparatus according to the first aspect, the compression member may have a fixed end on one side, and the ultrasound image may be obtained by causing the probe to perform scanning in a direction intersecting a line connecting the fixed end and a free end opposite to the fixed end.

According to a twelfth aspect of the present disclosure, in the image processing apparatus according to the first aspect, the radiation image to be associated with the corrected ultrasound image by the processor may not be subjected to correction based on the correction information.

Further, in order to achieve the object, according to a thirteenth aspect of the present disclosure, there is provided an image processing method executed by a computer, the method comprising: acquiring a radiation image and a plurality of continuously captured ultrasound images while a breast is kept in a compression state by a compression member; acquiring correction information related to at least one of a tilt of a probe that has performed scanning on the compression member during the capturing of the plurality of ultrasound images or a deflection of the compression member; generating a corrected ultrasound image corrected based on the correction information from the plurality of acquired ultrasound images; and associating the corrected ultrasound image with the radiation image.

Further, in order to achieve the object described above, according to a fourteenth aspect of the present disclosure, there is provided a non-transitory storage medium storing an image processing program for causing a computer to execute image processing, the image processing comprising: acquiring a radiation image and a plurality of continuously captured ultrasound images while a breast is kept in a compression state by a compression member; acquiring correction information related to at least one of a tilt of a probe that has performed scanning on the compression member during the capturing of the plurality of ultrasound images or a deflection of the compression member; generating a corrected ultrasound image corrected based on the correction information from the plurality of acquired ultrasound images; and associating the corrected ultrasound image with the radiation image.

In addition, in order to achieve the object, according to a fifteenth aspect of the present disclosure, there is provided an image processing apparatus comprising at least one processor, in which the processor is configured to: acquire a plurality of ultrasound images of a breast imaged in a compression state by a compression member; acquire correction information related to at least one of a tilt of a probe that has performed scanning on the compression member during the capturing of the plurality of ultrasound images or a deflection of the compression member; generate a corrected ultrasound image corrected based on the correction information from the plurality of acquired ultrasound images; acquire a radiation image of the breast through imaging; determine whether or not a compression state of the breast in the radiation image is considered to be the same as the compression state of the breast in the capturing of the plurality of ultrasound images; and associate the corrected ultrasound image with the radiation image in a case in which determination is made that the compression states of the breast are considered to be the same.

According to a sixteenth aspect of the present disclosure, in the image processing apparatus according to the fifteenth aspect, the processor may be configured to determine that, in a case in which the capturing of the plurality of ultrasound images and the capturing of the radiation image are continuously performed while the breast is kept in the compression state by the compression member, the compression states of the breast are considered to be the same.

According to a seventeenth aspect of the present disclosure, in the image processing apparatus according to the fifteenth aspect, the processor may be configured to determine that, in a case in which compression conditions for putting the breast into the compression state are the same, the compression states of the breast are considered to be the same.

According to an eighteenth aspect of the present disclosure, in the image processing apparatus according to the fifteenth aspect, the processor may be configured to determine that, in a case in which states of the breast in the compression state are the same, the compression states of the breast are considered to be the same.

According to a nineteenth aspect of the present disclosure, in the image processing apparatus according to the fifteenth aspect, the processor may be configured to further associate the radiation image with the corrected ultrasound image in a case in which a state of the breast itself in the capturing of the plurality of ultrasound images and a state of the breast itself in the capturing of the radiation image are considered to be the same.

According to a twentieth aspect of the present disclosure, in the image processing apparatus according to the fifteenth aspect, the processor may be configured to: further acquire a reference radiation image that is captured continuously with the capturing of the plurality of ultrasound images while the breast is kept in the compression state by the compression member; and determine that, in a case in which a degree of similarity between the reference radiation image and the radiation image satisfies a predetermined criterion, the compression states of the breast are considered to be the same.

According to a twenty-first aspect of the present disclosure, in the image processing apparatus according to the fifteenth aspect, the processor may be configured to acquire a detection result of a sensor that detects at least one of the tilt of the probe or the deflection of the compression member as the correction information.

According to a twenty-second aspect of the present disclosure, in the image processing apparatus according to the twenty-first aspect, the sensor may be a sensor provided on the probe for detecting the tilt of the probe.

According to a twenty-third aspect of the present disclosure, in the image processing apparatus according to the twenty-second aspect, the sensor may be any of a magnetic sensor, a gyro sensor, or an acceleration sensor.

According to a twenty-fourth aspect of the present disclosure, in the image processing apparatus according to the twenty-first aspect, the sensor may be a sensor that detects a distance between the compression member and a predetermined position.

According to a twenty-fifth aspect of the present disclosure, in the image processing apparatus according to the twenty-fourth aspect, the sensor may be at least one of a TOF camera, a 3D camera, or a laser distance measurement device.

According to a twenty-sixth aspect of the present disclosure, in the image processing apparatus according to the fifteenth aspect, the correction information may include a thickness and a width of the breast in the compression state and a pressure for compressing the breast, and the processor may be configured to generate the corrected ultrasound image from the plurality of ultrasound images corrected based on the deflection of the compression member specified based on correspondence relationship information indicating a correspondence relationship among the width or the width and the thickness of the breast in the compression state, the pressure for compressing the breast, and information indicating the deflection of the compression member.

According to a twenty-seventh aspect of the present disclosure, in the image processing apparatus according to the fifteenth aspect, the processor may be configured to correct coordinates of each of the plurality of ultrasound images based on the correction information, and then generate a three-dimensional ultrasound image as the corrected ultrasound image through reconstruction.

According to a twenty-eighth aspect of the present disclosure, in the image processing apparatus according to the twenty-seventh aspect, the processor may be configured to perform affine transformation on each of the plurality of ultrasound images based on a deflection angle of the compression member at an imaging position of each of the plurality of ultrasound images, the deflection angle being obtained based on the correction information.

According to a twenty-ninth aspect of the present disclosure, in the image processing apparatus according to the twenty-eighth aspect, the correction information may include information indicating each of a width and a thickness of the breast in the compression state and a pressure for compressing the breast, and the processor may be configured to derive the deflection angle from the correction information.

According to a thirtieth aspect of the present disclosure, in the image processing apparatus according to the fifteenth aspect, the compression member may have a fixed end on one side, and the ultrasound image may be obtained by causing the probe to perform scanning in a direction intersecting a line connecting the fixed end and a free end opposite to the fixed end.

According to a thirty-first aspect of the present disclosure, in the image processing apparatus according to the fifteenth aspect, the radiation image to be associated with the corrected ultrasound image by the processor may not be subjected to correction based on the correction information.

In addition, in order to achieve the above object, according to a thirty-second aspect of the present disclosure, there is provided an image processing method executed by a computer, the method comprising: acquiring a plurality of ultrasound images of a breast imaged in a compression state by a compression member; acquiring correction information related to at least one of a tilt of a probe that has performed scanning on the compression member during the capturing of the plurality of ultrasound images or a deflection of the compression member; generating a corrected ultrasound image corrected based on the correction information from the plurality of acquired ultrasound images; acquiring a radiation image of the breast through imaging; determining whether or not a compression state of the breast in the radiation image is considered to be the same as the compression state of the breast in the capturing of the plurality of ultrasound images; and associating the corrected ultrasound image with the radiation image in a case in which determination is made that the compression states of the breast are considered to be the same.

In addition, in order to achieve the above object, according to a thirty-third aspect of the present disclosure, there is provided a non-transitory storage medium storing an image processing program for causing a computer to execute image processing, the image processing comprising: acquiring a plurality of ultrasound images of a breast imaged in a compression state by a compression member; acquiring correction information related to at least one of a tilt of a probe that has performed scanning on the compression member during the capturing of the plurality of ultrasound images or a deflection of the compression member; generating a corrected ultrasound image corrected based on the correction information from the plurality of acquired ultrasound images; acquiring a radiation image of the breast through imaging; determining whether or not a compression state of the breast in the radiation image is considered to be the same as the compression state of the breast in the capturing of the plurality of ultrasound images; and associating the corrected ultrasound image with the radiation image in a case in which determination is made that the compression states of the breast are considered to be the same.

Further, in order to achieve the above object, according to a thirty-fourth aspect of the present disclosure, there is provided an image processing apparatus comprising at least one processor, in which the processor is configured to: acquire a reference radiation image and a plurality of continuously captured ultrasound images while a breast is kept in a compression state by a compression member; acquire correction information related to at least one of a tilt of a probe that has performed scanning on the compression member during the capturing of the plurality of ultrasound images or a deflection of the compression member; generate a corrected ultrasound image corrected based on the correction information from the plurality of acquired ultrasound images; acquire a radiation image of the breast through imaging; and determine whether or not to associate the corrected ultrasound image with the radiation image based on a degree of similarity between the reference radiation image and the radiation image.

According to a thirty-fifth aspect of the present disclosure, in the image processing apparatus according to the thirty-fourth aspect, the processor may be configured to associate the corrected ultrasound image with the radiation image in a case in which the degree of similarity between the reference radiation image and the radiation image satisfies a predetermined criterion.

According to a thirty-sixth aspect of the present disclosure, in the image processing apparatus according to the thirty-fifth aspect, the predetermined criterion may be a criterion for considering that compression states of the breast in the imaging are the same.

According to a thirty-seventh aspect of the present disclosure, in the image processing apparatus according to the thirty-fourth aspect, the processor may be configured to acquire a detection result of a sensor that detects at least one of the tilt of the probe or the deflection of the compression member as the correction information.

According to a thirty-eighth aspect of the present disclosure, in the image processing apparatus according to the thirty-seventh aspect, the sensor may be a sensor provided on the probe for detecting the tilt of the probe.

According to a thirty-ninth aspect of the present disclosure, in the image processing apparatus according to the thirty-eighth aspect, the sensor may be any of a magnetic sensor, a gyro sensor, or an acceleration sensor.

According to a fortieth aspect of the present disclosure, in the image processing apparatus according to the thirty-seventh aspect, the sensor may be a sensor that detects a distance between the compression member and a predetermined position.

According to a forty-first aspect of the present disclosure, in the image processing apparatus according to the fortieth aspect, the sensor may be at least one of a TOF camera, a 3D camera, or a laser distance measurement device.

According to a forty-second aspect of the present disclosure, in the image processing apparatus according to the thirty-fourth aspect, the correction information may include a thickness and a width of the breast in the compression state and a pressure for compressing the breast, and the processor may be configured to generate the corrected ultrasound image from the plurality of ultrasound images corrected based on the deflection of the compression member specified based on correspondence relationship information indicating a correspondence relationship among the width or the width and the thickness of the breast in the compression state, the pressure for compressing the breast, and information indicating the deflection of the compression member.

According to a forty-third aspect of the present disclosure, in the image processing apparatus according to the thirty-fourth aspect, the processor may be configured to correct coordinates of each of the plurality of ultrasound images based on the correction information, and then generate a three-dimensional ultrasound image as the corrected ultrasound image through reconstruction.

According to a forty-fourth aspect of the present disclosure, in the image processing apparatus according to the forty-third aspect, the processor may be configured to perform affine transformation on each of the plurality of ultrasound images based on a deflection angle of the compression member at an imaging position of each of the plurality of ultrasound images, the deflection angle being obtained based on the correction information.

According to a forty-fifth aspect of the present disclosure, in the image processing apparatus according to the forty-fourth aspect, the correction information may include information indicating each of a width and a thickness of the breast in the compression state and a pressure for compressing the breast, and the processor may be configured to derive the deflection angle from the correction information.

According to a forty-sixth aspect of the present disclosure, in the image processing apparatus according to the thirty-fourth aspect, the compression member may have a fixed end on one side, and the ultrasound image may be obtained by causing the probe to perform scanning in a direction intersecting a line connecting the fixed end and a free end opposite to the fixed end.

According to a forty-seventh aspect of the present disclosure, in the image processing apparatus according to the thirty-fourth aspect, the radiation image that the processor determines whether or not to associate with the corrected ultrasound image may not be subjected to correction based on the correction information.

In addition, in order to achieve the above object, according to a forty-eighth aspect of the present disclosure, there is provided an image processing method executed by a computer, the method comprising: acquiring a reference radiation image and a plurality of continuously captured ultrasound images while a breast is kept in a compression state by a compression member; acquiring correction information related to at least one of a tilt of a probe that has performed scanning on the compression member during the capturing of the plurality of ultrasound images or a deflection of the compression member; generating a corrected ultrasound image corrected based on the correction information from the plurality of acquired ultrasound images; acquiring a radiation image of the breast through imaging; and determining whether or not to associate the corrected ultrasound image with the radiation image based on a degree of similarity between the reference radiation image and the radiation image.

In addition, in order to achieve the above object, according to a forty-ninth aspect of the present disclosure, there is provided a non-transitory storage medium storing an image processing program for causing a computer to execute image processing, the image processing comprising: acquiring a reference radiation image and a plurality of continuously captured ultrasound images while a breast is kept in a compression state by a compression member; acquiring correction information related to at least one of a tilt of a probe that has performed scanning on the compression member during the capturing of the plurality of ultrasound images or a deflection of the compression member; generating a corrected ultrasound image corrected based on the correction information from the plurality of acquired ultrasound images; acquiring a radiation image of the breast through imaging; and determining whether or not to associate the corrected ultrasound image with the radiation image based on a degree of similarity between the reference radiation image and the radiation image.

In addition, in order to achieve the above object, according to a fiftieth aspect of the present disclosure, there is provided an image capturing system comprising: the image processing apparatus according to the aspect of the present disclosure; a radiography apparatus; and an ultrasonography apparatus.

According to the aspects of the present disclosure, it is possible to easily compare a radiation image and an ultrasound image of a breast imaged in a compression state.

BRIEF DESCRIPTION OF THE DRAWINGS

FIG. 8 is a view for describing correction of an ultrasound image by an image correction unit.

FIG. 12A is a flowchart showing an example of a flow of individually capturing a radiation image using an image capturing system according to the second embodiment.

FIG. 12B is a flowchart showing an example of a flow of individually capturing an ultrasound image using the image capturing system according to the second embodiment.

FIG. 17 is a flowchart showing an example of a flow of image processing in an image processing apparatus according to a third embodiment.

DESCRIPTION OF EMBODIMENTS

Embodiments of the present invention will be described in detail below with reference to the drawings. Note that the present embodiment does not limit the present invention.

First Embodiment

Figure 1:
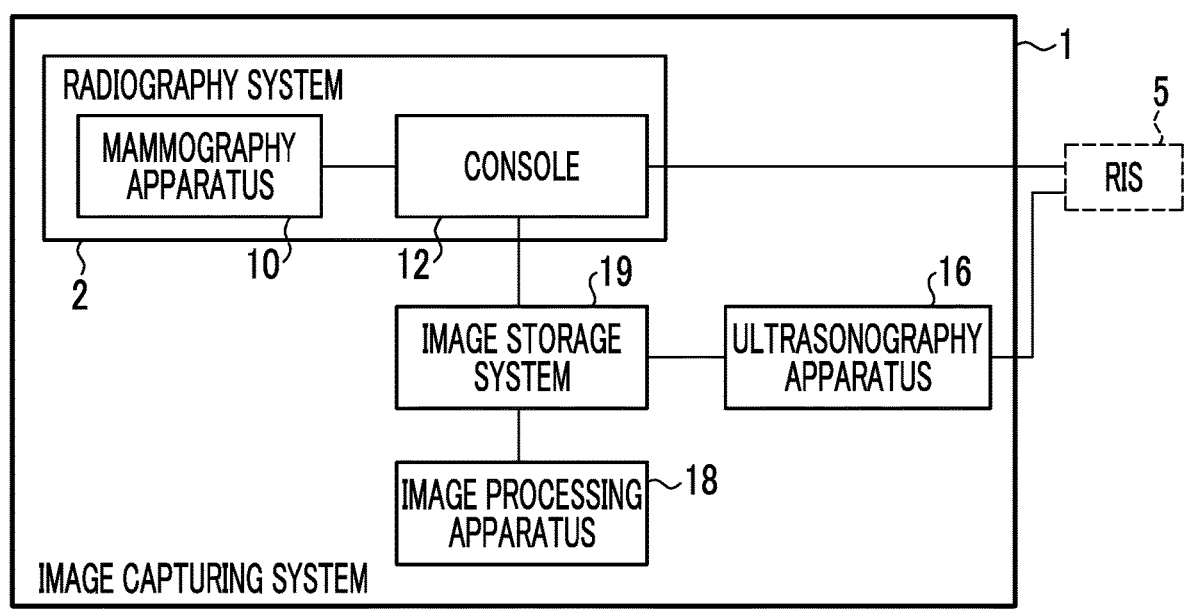
FIG. 1 is a configuration diagram schematically showing an example of the overall configuration of an image capturing system according to a first embodiment.

First, an example of the overall configuration of a medical imaging system according to the present embodiment will be described. FIG. 1 is a configuration diagram showing an example of the overall configuration of an image capturing system 1 according to the present embodiment.

As shown in FIG. 1, the image capturing system 1 according to the present embodiment comprises a radiography system 2, an ultrasonography apparatus 16, an image processing apparatus 18, and an image storage system 19.

First, the configuration of the radiography system 2 will be described. The radiography system 2 includes a mammography apparatus 10 and a console 12.

The mammography apparatus 10 of the present embodiment is an apparatus that uses a breast of the examinee as a subject and captures a radiation image of the breast by irradiating the breast with radiation R (for example, X-rays). Note that the mammography apparatus 10 may be an apparatus that images the breast of the examinee in a state in which the examinee is sitting on a chair (including a wheelchair) or the like (sitting state) in addition to a state in which the examinee is standing (standing state).

Figure 2:
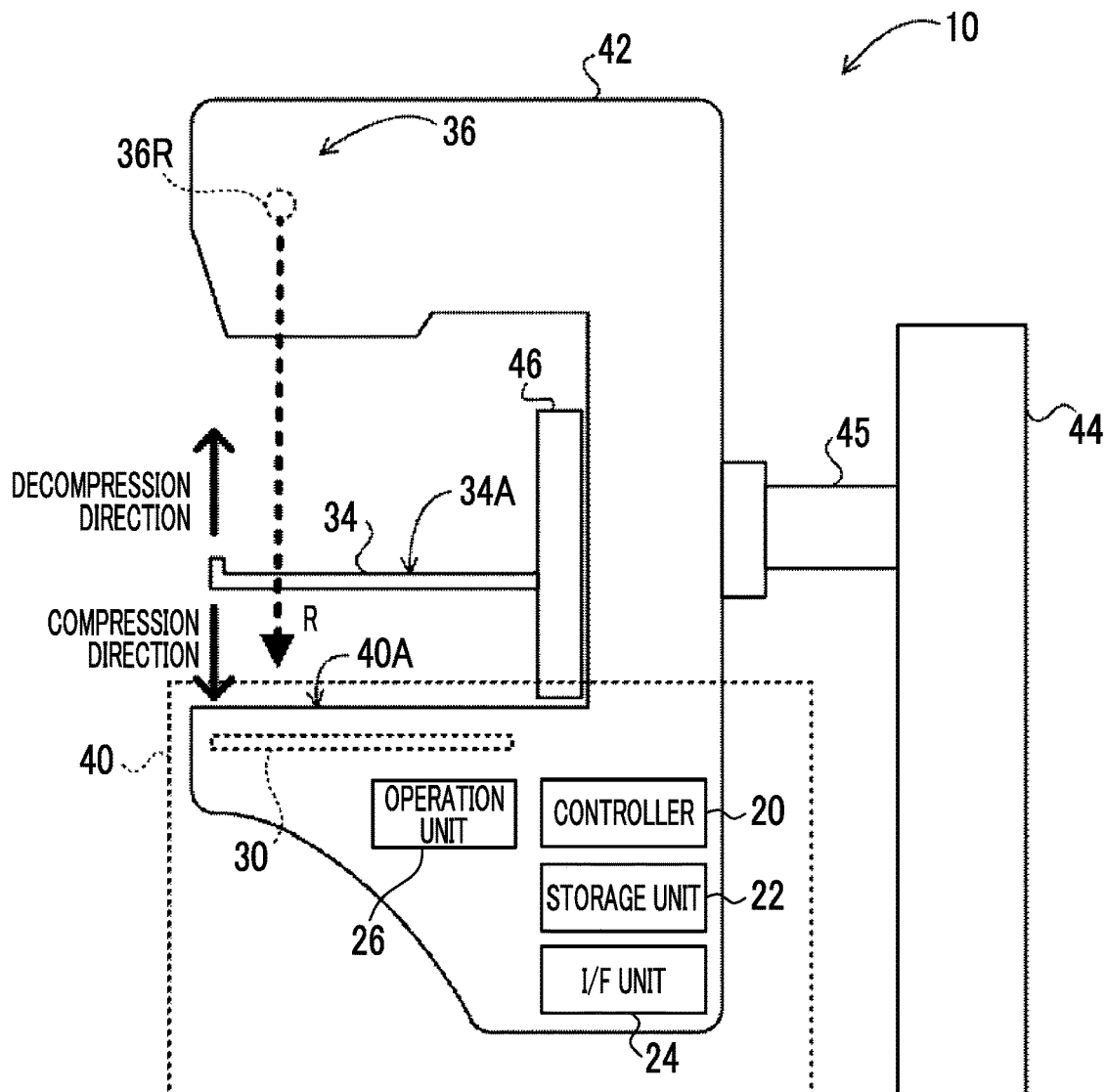
FIG. 2 is a side view showing an example of the appearance of a mammography apparatus according to the first embodiment.

FIG. 2 is a side view showing an example of the appearance of the mammography apparatus 10 of the present embodiment. In addition, FIG. 2 is a side view showing the mammography apparatus 10 as viewed from the right side of an examinee. As shown in FIG. 2, the mammography apparatus 10 comprises a radiation source 36R, a radiation detector 30, an imaging table 40 disposed between the radiation source 36R and the radiation detector 30, and a compression member 34 that compresses the breast between the compression member 34 and the imaging table 40.

The imaging table 40 comprises a controller 20, a storage unit 22, an interface (I/F) unit 24, an operation unit 26, and the radiation detector 30. The controller 20 controls an overall operation of the mammography apparatus 10 in accordance with the control of the console 12. The controller 20 comprises a central processing unit (CPU), a read-only memory (ROM), a random-access memory (RAM), and the like (not shown). The ROM stores, in advance, various programs, including a program for performing control related to radiation image capturing, which is executed by the CPU. The RAM transitorily stores various types of data.

Image data of a radiation image and various other types of information are stored in the storage unit 22. The storage unit 22 is realized by, for example, a storage medium such as a hard disk drive (HDD), a solid-state drive (SSD), and a flash memory. Note that, hereinafter, "image data of a radiation image" is simply referred to as a "radiation image". Similarly, "image data of an ultrasound image" is simply referred to as an "ultrasound image".

The I/F unit 24 communicates various types of information with the console 12 through wired communication or wireless communication. Specifically, the I/F unit 24 receives information regarding the control of the mammography apparatus 10 from the console 12. In addition, the I/F unit 24 transmits a radiation image to the console 12.

The operation unit 26 is a part provided on the imaging table 40 or the like and operable by a user with a hand, a foot, or the like, and is, for example, a switch, a button, a touch panel, or the like. Further, for example, the operation unit 26 may receive a voice input from the user.

The radiation detector 30 is disposed inside the imaging table 40 and detects the radiation R transmitted through the breast which is the subject. In the mammography apparatus 10 of the present embodiment, in a case in which imaging is performed, the breast of the examinee is positioned on an imaging surface 40A of the imaging table 40 by a user such as a doctor or a radiology technician. For example, the imaging surface 40A and the like with which the breast of the examinee comes into contact are made of carbon or the like in terms of the transmittance and intensity of the radiation R.

The radiation detector 30 detects the radiation R transmitted through the breast of the examinee and the imaging table 40, generates a radiation image based on the detected radiation R, and outputs the generated radiation image. The type of the radiation detector 30 of the present embodiment is not particularly limited. For example, the radiation detector 30 may be an indirect conversion type radiation detector that converts the radiation R into light and converts the converted light into electric charges, or may be a direct conversion type radiation detector that directly converts the radiation R into electric charges.

The radiation source 36R is provided in a radiation emitting unit 36. As shown in FIG. 2, the radiation emitting unit 36 is provided on the arm part 42 together with the imaging table 40 and a compression unit 46. In addition, as shown in FIG. 2, the mammography apparatus 10 of the present embodiment comprises the arm part 42, a base 44, and a shaft part 45. The arm part 42 is held by the base 44 so as to be movable in an up-down direction (Z-axis direction). The shaft part 45 connects the arm part 42 to the base 44. Further, the arm part 42 can be relatively rotated with respect to the base 44, using the shaft part 45 as a rotation axis.

Further, as shown in FIG. 2, the compression member 34 is attached to the compression unit 46. The compression unit 46 and the arm part 42 can be relatively rotated with respect to the base 44 separately, using the shaft part 45 as a rotation axis. In the present embodiment, gears (not shown) are provided in each of the shaft part 45, the arm part 42, and the compression unit 46. Each gear is switched between an engaged state and a disengaged state to connect each of the arm part 42 and the compression unit 46 to the shaft part 45. One or both of the arm part 42 and the compression unit 46 connected to the shaft part 45 are rotated integrally with the shaft part 45.

The compression member 34 of the present embodiment is a plate-shaped member, and is moved in the up-down direction (Z-axis direction) by a compression plate drive part (not shown) provided in the compression unit 46 to compress the breast of the examinee between the compression member 34 and the imaging table 40. As shown in FIG. 2, regarding the movement direction of the compression member 34, the direction in which the breast is compressed, in other words, the direction in which the compression member 34 becomes closer to the imaging surface 40A is referred to as a "compression direction" and the direction in which the compression of the breast is released, in other words, the direction in which the compression member 34 becomes closer to the radiation emitting unit 36 is referred to as a "decompression direction".

It is preferable that the compression member 34 is optically transparent in order to check positioning or a compression state in the compression of the breast. In addition, the compression member 34 is made of a material having high transmittance for the radiation R. Further, it is desirable that the compression member 34 is made of a material that facilitates the transmission of ultrasonic waves from an ultrasound probe 55 (see FIG. 3, details will be described later) of the ultrasonography apparatus 16. Examples of the material forming the compression member 34 include resins such as polymethylpentene, polycarbonate, acrylic, or polyethylene terephthalate. In particular, polymethylpentene is suitable as the material forming the compression member 34 since it has low rigidity, high elasticity, and high flexibility and has suitable values for acoustic impedance that affects the reflectance of ultrasonic waves and an attenuation coefficient that affects the attenuation of ultrasonic waves. The member forming the compression member 34 is not limited to the present embodiment. For example, the member forming the compression member 34 may be a film-like member.

Note that the compression member 34 is not limited to one that compresses the entire breast, but may be one that compresses a part of the breast. In other words, the compression member 34 may be smaller than the breast. As such a compression member 34, for example, a compression member 34 used for so-called spot imaging, in which a radiation image is captured of only a region where a lesion exists, is known.

On the other hand, the console 12 of the present embodiment has a function of controlling the mammography apparatus 10 using an imaging order and various types of information acquired from a radiology information system (RIS) 5 or the like through a wireless communication local area network (LAN), instructions input by the user using an operation unit 56 or the like, and the like. The console 12 of the present embodiment is, for example, a server computer.

Figure 3:
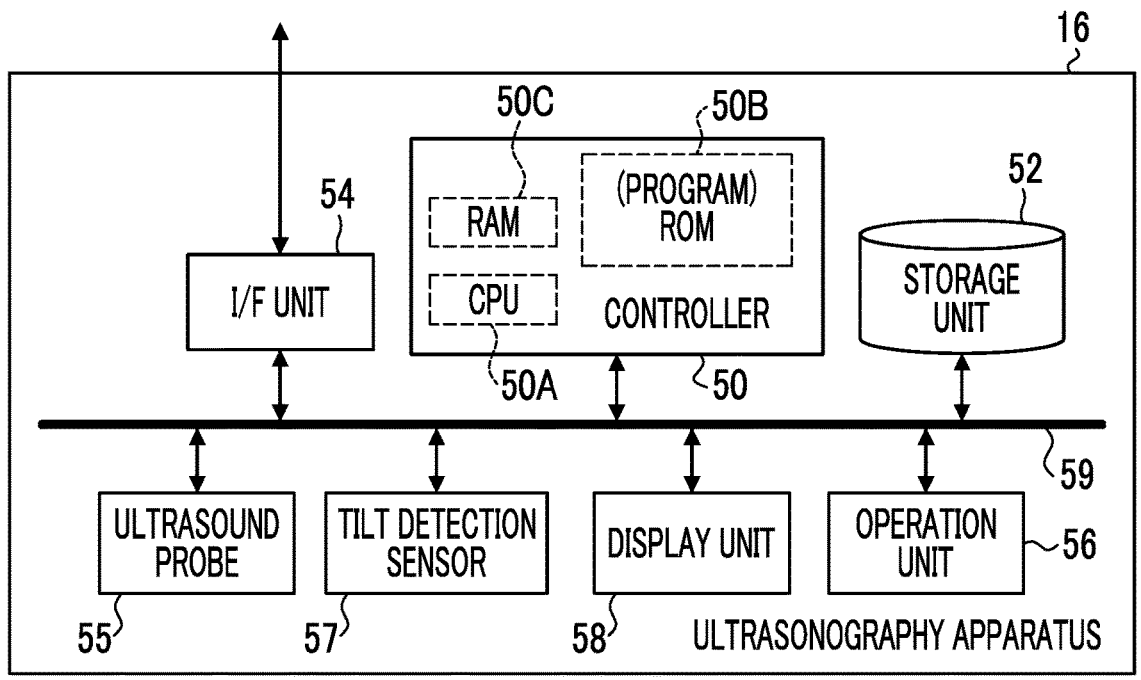
FIG. 3 is a block diagram showing an example of the configuration of an ultrasonography apparatus according to the first embodiment.

Next, the configuration of the ultrasonography apparatus 16 will be described. FIG. 3 is a block diagram showing an example of the configuration of the ultrasonography apparatus 16. The ultrasonography apparatus 16 is an apparatus that is used to capture an ultrasound image of the breast of the examinee as a subject by a user and is a so-called handheld type ultrasonography apparatus.

As shown in FIG. 3, the ultrasonography apparatus 16 comprises a controller 50, a storage unit 52, an I/F unit 54, an ultrasound probe 55, an operation unit 56, a tilt detection sensor 57, and a display unit 58. The controller 50, the storage unit 52, the I/F unit 54, the ultrasound probe 55, the operation unit 56, the tilt detection sensor 57, and the display unit 58 are connected to each other through a bus 59 such as a system bus or a control bus, such that they can exchange various types of information with each other.

The controller 50 of the present embodiment controls the overall operation of the ultrasonography apparatus 16. The controller 50 comprises a CPU 50A, a ROM 50B, and a RAM 50C. The ROM 50B stores in advance various programs to be executed by the CPU 50A. The RAM 50C transitorily stores various types of data.

For example, captured ultrasound images and various other types of information are stored in the storage unit 52. Specific examples of the storage unit 52 include an HDD, an SSD, and the like.

The ultrasound probe 55 is moved along an upper surface 34A (see FIG. 2, a surface opposite to the surface that comes into contact with the breast of the examinee) of the compression member 34 by the user and scans the breast with ultrasound to acquire an ultrasound image of the breast. Specifically, in a case in which an ultrasound imaging is performed, the ultrasound probe 55 is moved by the user along the upper surface 34A of the compression member 34 in a state in which an acoustic matching member (not shown), such as echo jelly, is applied onto the upper surface 34A of the compression member 34.

The ultrasound probe 55 comprises a plurality of ultrasound transducers (not shown) which are one-dimensionally or two-dimensionally arranged. Each of the ultrasound transducers transmits ultrasonic waves based on an applied drive signal, receives ultrasound echoes, and outputs a received signal.

Each of the plurality of ultrasound transducers is composed of, for example, a transducer in which electrodes are formed at both ends of a piezoelectric material (piezoelectric body) such as a piezoelectric ceramic represented by lead (Pb) zirconate titanate (PZT) or a polymer piezoelectric element represented by polyvinylidene difluoride (PVDF). In a case in which a pulsed or continuous wave drive signal is transmitted to apply a voltage to the electrodes of the transducer, the piezoelectric body is expanded and contracted. Pulsed or continuous ultrasonic waves are generated from each transducer by the expansion and contraction and the ultrasonic waves are combined to form an ultrasound beam. Further, each transducer receives the propagated ultrasonic waves and is then expanded and contracted to generate an electric signal. The electric signal is output as an ultrasound received signal and is input to the main body (not shown) of the ultrasonography apparatus 16 through a cable (not shown).

The tilt detection sensor 57 is a sensor for detecting the tilt of the ultrasound probe 55. As described above, in the present embodiment, in a case in which an ultrasound image is captured, the ultrasound probe 55 is moved along the upper surface 34A of the compression member 34. Although the details will be described later, in a case in which the compression member 34 deflects according to the shape of the compressed breast, the ultrasound probe 55 that is moved along the upper surface 34A of the compression member 34 is in a tilt state with respect to the imaging surface 40A of the imaging table 40 of the mammography apparatus 10. The tilt detection sensor 57 detects the tilt of the ultrasound probe 55 tilted in this manner. That is, the tilt detection sensor 57 of the present embodiment detects the tilt of the imaging table 40 with respect to the imaging surface 40A during imaging of an ultrasound image. Specifically, the tilt detection sensor 57 detects the angle formed by a perpendicular line to the imaging surface 40A of the imaging table 40. Specific examples of such a tilt detection sensor 57 include any of a magnetic sensor, a gyro sensor, or an acceleration sensor. Note that, the tilt detection sensor 57 may be provided inside the ultrasound probe 55 or may be provided outside the ultrasound probe 55. In addition, unlike the present embodiment, the tilt detection sensor 57 may be provided separately from the ultrasonography apparatus 16. In any case, as long as the tilt detection sensor 57 can detect the tilt of the ultrasound probe 55, there are no limitations on its disposition or configuration.

The operation unit 56 is used by the user to input, for example, instructions or various types of information regarding the capture and the like of an ultrasound image. The operation unit 56 is not particularly limited, and examples of the operation unit 56 include various switches, a touch panel, a touch pen, a mouse, and the like. The display unit 58 displays, for example, various types of information or an ultrasound image corresponding to the received signal from the ultrasound probe 55. Note that, the operation unit 56 and the display unit 58 may be integrated into a touch panel display.

The I/F unit 54 communicates various types of information with the RIS 5 and the image storage system 19 through wireless communication or wired communication. The ultrasound image captured by the ultrasonography apparatus 16 is transmitted to the image storage system 19 through the I/F unit 54 through wireless communication or wired communication.

Next, the image storage system 19 will be described. The image storage system 19 is a system that stores the radiation image captured by the radiography system 2 and the ultrasound image captured by the ultrasonography apparatus 16. The image storage system 19 is connected to each of the console 12 and the ultrasonography apparatus 16 through wireless communication or wired communication. The image storage system 19 extracts an image corresponding to a request from, for example, the console 12, the ultrasonography apparatus 16, and other interpretation devices (not shown) from the stored radiation images and ultrasound images and transmits the extracted image to the apparatus which is the request source. A specific example of the image storage system 19 is a picture archiving and communication system (PACS).

Next, the image processing apparatus 18 will be described. The image processing apparatus 18 has a function of acquiring each of a radiation image captured by the radiography system 2 and an ultrasound image captured by the ultrasonography apparatus 16 from the image storage system 19 and performing predetermined image processing.

Figure 4:
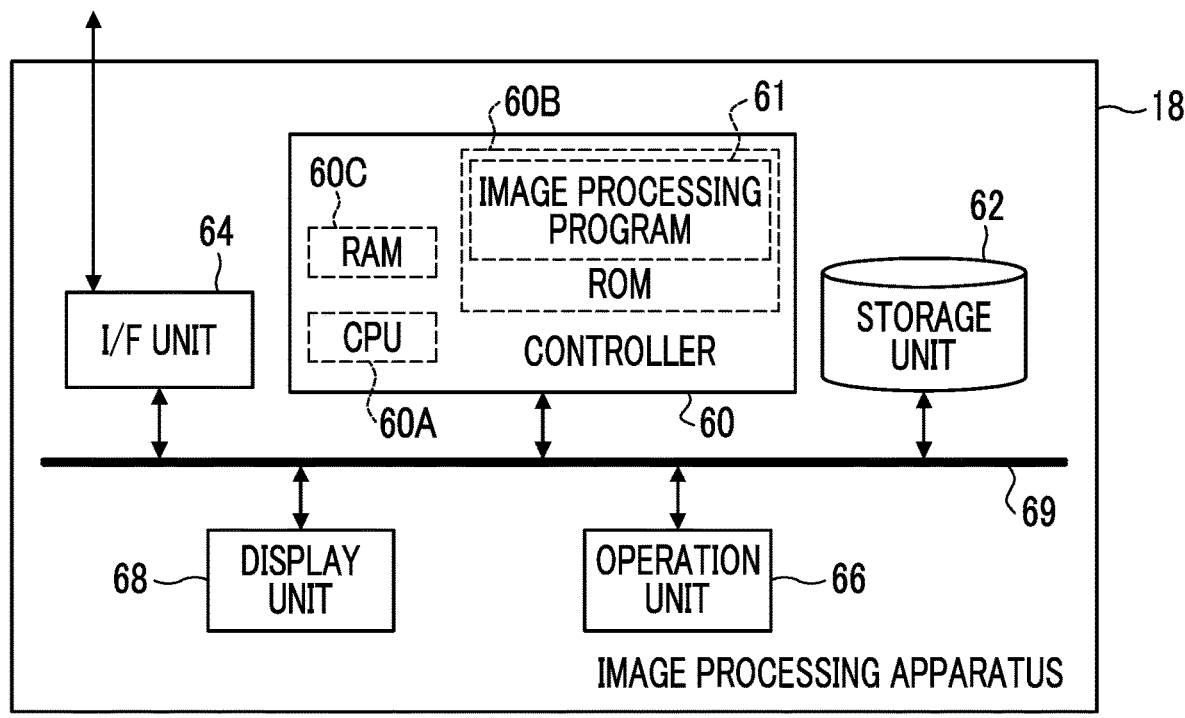
FIG. 4 is a block diagram showing an example of the configuration of an image processing apparatus according to the first embodiment.

FIG. 4 is a block diagram showing an example of the configuration of the image processing apparatus 18. As shown in FIG. 4, the image processing apparatus 18 comprises a controller 60, a storage unit 62, an I/F unit 64, an operation unit 66, and a display unit 68. The controller 60, the storage unit 62, the I/F unit 64, the operation unit 66, and the display unit 68 are connected to each other through a bus 69 such as a system bus or a control bus, such that they can exchange various types of information with each other.

The controller 60 of the present embodiment controls the overall operation of the image processing apparatus 18. The controller 60 comprises a CPU 60A, a ROM 60B, and a RAM 60C. The ROM 60B stores in advance various programs including an image processing program 61 to be described later, which is executed by the CPU 60A. The RAM 60C transitorily stores various types of data.

The storage unit 62 stores, for example, the radiation image, the ultrasound image, and various other types of information acquired from the image storage system 19. Specific examples of the storage unit 62 include an HDD, an SSD, and the like.

The operation unit 66 is used by the user to input, for example, instructions or various types of information regarding image processing. Note that, the operation unit 66 is not particularly limited, and examples of the operation unit 66 include various switches, a touch panel, a touch pen, a mouse, and the like. The display unit 68 displays various types of information. Note that, the operation unit 66 and the display unit 68 may be integrated into a touch panel display.

The I/F unit 64 communicates radiation images, ultrasound images, and various types of information with the image storage system 19 through wireless communication or wired communication.

Figure 5:
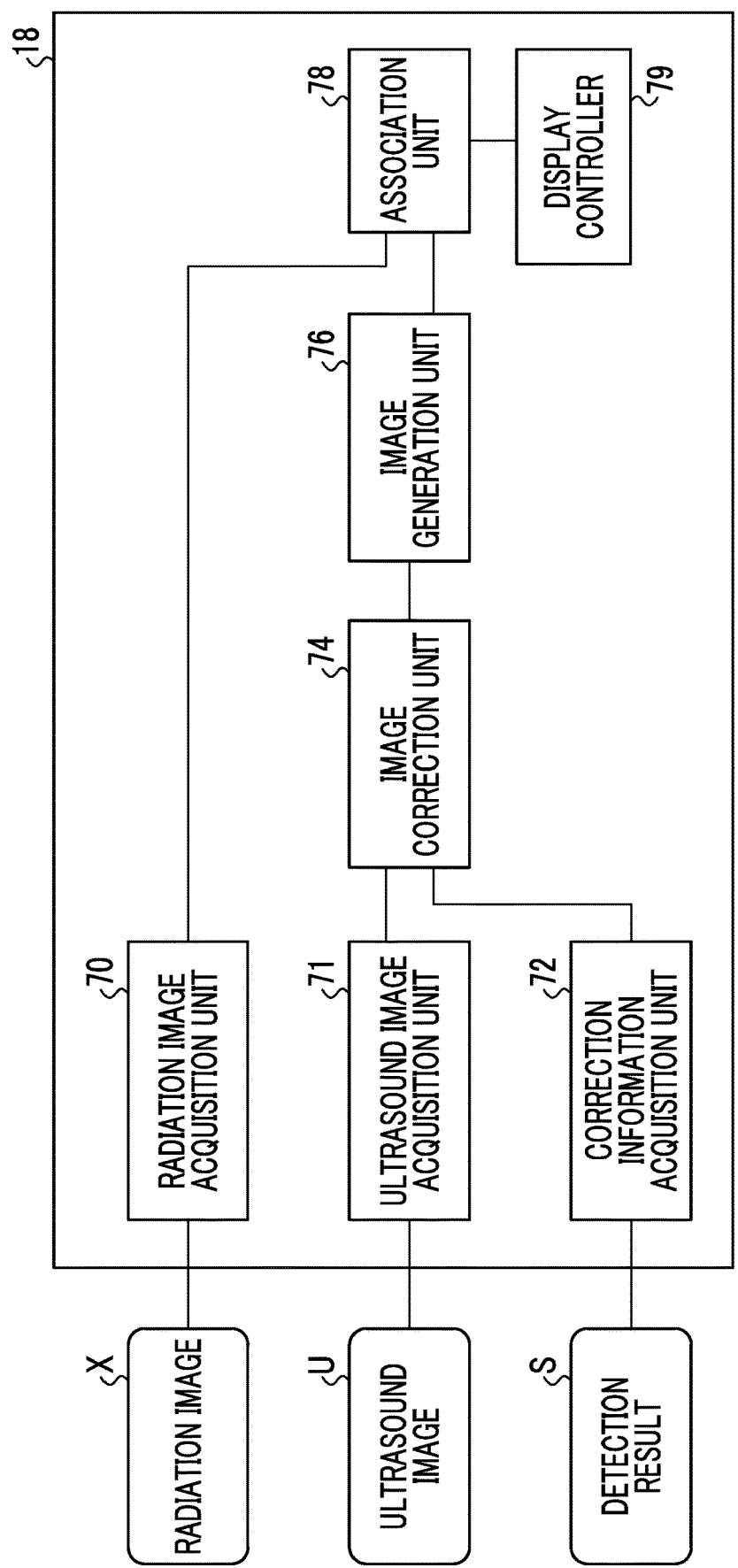
FIG. 5 is a functional block diagram showing an example of the configuration of the image processing apparatus according to the first embodiment.

FIG. 5 is a functional block diagram showing an example of the functions of the image processing apparatus 18. The image processing apparatus 18 comprises a radiation image acquisition unit 70, an ultrasound image acquisition unit 71, a correction information acquisition unit 72, an image correction unit 74, an image generation unit 76, an association unit 78, and a display controller 79. As an example, in the image processing apparatus 18 according to the present embodiment, the CPU 60A of the controller 60 executes the image processing program 61, and thereby the CPU 60A functions as the radiation image acquisition unit 70, the ultrasound image acquisition unit 71, the correction information acquisition unit 72, the image correction unit 74, the image generation unit 76, the association unit 78, and the display controller 79.

The radiation image acquisition unit 70 has a function of acquiring a radiation image X. As an example, in the present embodiment, a set of radiation images X and ultrasound images U obtained by continuous imaging, which will be described in detail later, satisfying display conditions input by the user through the operation unit 66 is acquired. Therefore, in a case in which the display conditions input by the user are received, the radiation image acquisition unit 70 acquires the radiation image X out of the set of radiation images X and ultrasound images U corresponding to the received display conditions from the image storage system 19 via the I/F unit 64. The display conditions include identification information that identifies the examinee and the breast, information indicating an imaging date and time, identification information given for each set of imaging, and the like. The radiation image acquisition unit 70 outputs the acquired radiation image to the association unit 78.

The ultrasound image acquisition unit 71 has a function of acquiring an ultrasound image U. As described above, the ultrasound image acquisition unit 71 of the present embodiment acquires, from the image storage system 19, the ultrasound image U corresponding to the display condition used in a case in which the radiation image acquisition unit 70 acquires a radiation image, via the I/F unit 64. In addition, in the ultrasonography apparatus 16 of the present embodiment, the ultrasound image U of the entire breast is captured by repeating imaging a plurality of times while scanning the ultrasound probe 55. That is, a plurality of ultrasound images U that are continuously captured are obtained for the entire breast. Therefore, the ultrasound image acquisition unit 71 acquires a plurality of ultrasound images U. Note that, in order to simplify the description, the plurality of ultrasound images U may be simply referred to as "ultrasound images U". The ultrasound image acquisition unit 71 outputs the acquired ultrasound images U to the image correction unit 74.

That is, in the present embodiment, out of a set of radiation images X and ultrasound images U that are continuously captured, the radiation image X is acquired by the radiation image acquisition unit 70, and the ultrasound image U is acquired by the ultrasound image acquisition unit 71.

The correction information acquisition unit 72 has a function of acquiring a detection result S as correction information from the tilt detection sensor 57 provided in the ultrasonography apparatus 16. Specific examples of the detection result S, that is, the correction information, include a position (XY coordinates) within the upper surface 34A of the compression member 34 or within the imaging surface 40A of the imaging table 40, and a tilt angle of the ultrasound probe 55 at that position. The correction information acquisition unit 72 outputs the acquired correction information to the image correction unit 74.

Figure 6:
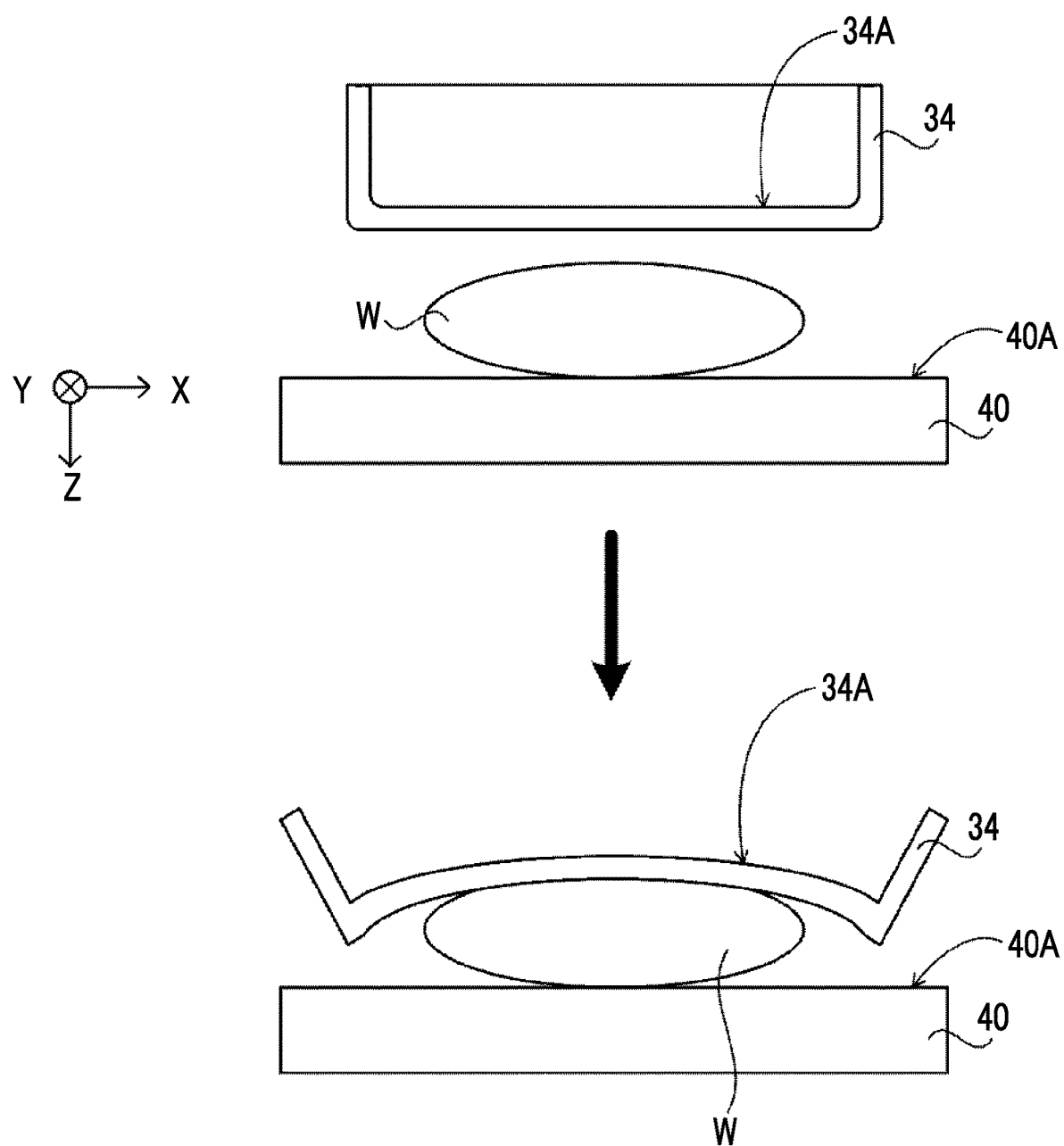
FIG. 6 is a view for describing a deflection of a compression member due to compression of a breast.

The image correction unit 74 corrects coordinates of each of the plurality of ultrasound images U based on correction information. Here, correction of the ultrasound image U will be described. As shown in FIG. 6, the compression member 34 before the breast W is compressed can be considered to be in a state in which there is no deflection and the upper surface 34A is parallel to the imaging table 40. That is, the upper surface 34A of the compression member 34 before the breast W is compressed and the imaging surface 40A of the imaging table 40 can be considered to be in a parallel state. In a case in which the compression member 34 is moved in the compression direction from this state to put the breast W into the compression state, the compression member 34 is deflected depending on the shape of the breast W and the like. In the mammography apparatus 10 of the present embodiment, the compression member 34 is particularly likely to deflect in the X direction (left-right direction of the examinee). Therefore, the upper surface 34A of the compression member 34 and the imaging surface 40A of the imaging table 40 are in a non-parallel state. In a case in which a radiation image X of the breast W is captured in a compression state by the compression member 34, it is possible to obtain an image that can be considered parallel to the imaging surface 40A regardless of the deflection of the compression member 34.

Figure 7:
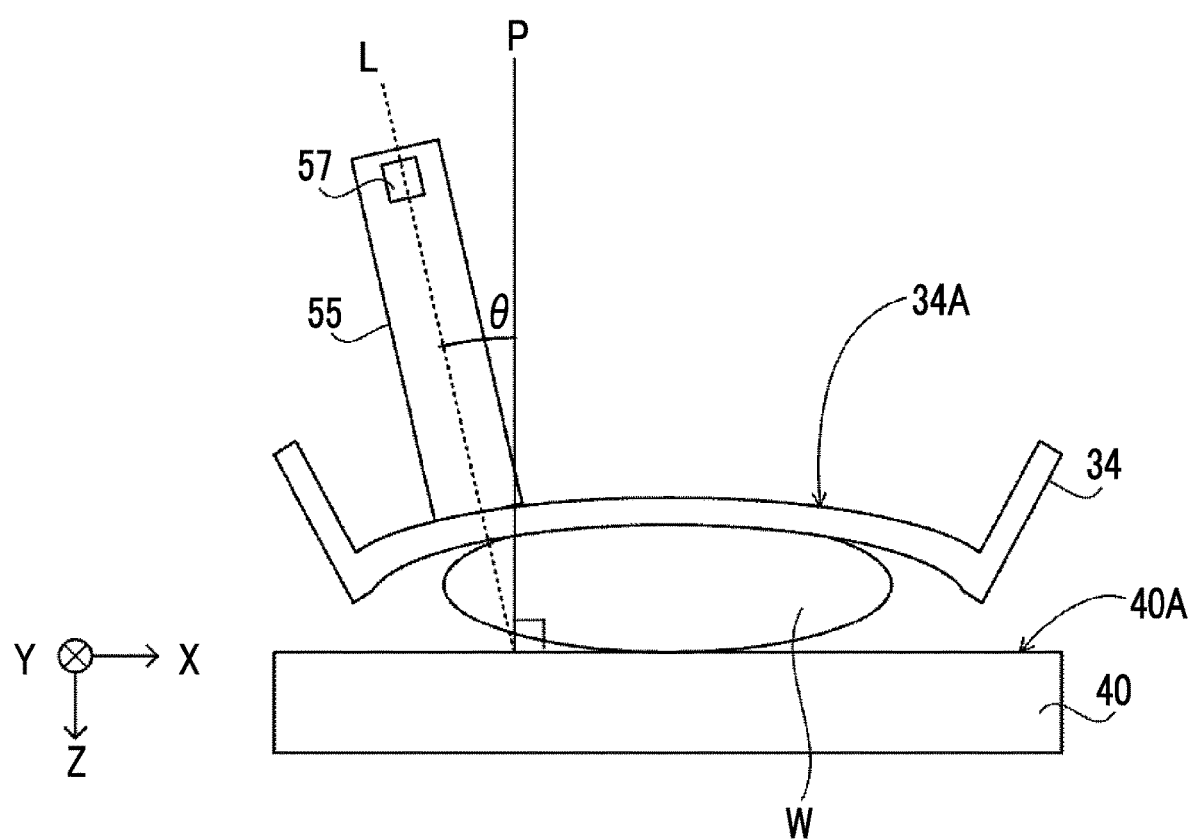
FIG. 7 is a view for describing a tilt of an ultrasound probe due to the deflection of the compression member.

On the other hand, in a case in which an ultrasound image X of the breast W is captured in a compression state by the compression member 34, as shown in FIG. 7, in order to align the ultrasound probe 55 along the upper surface 34A of the compression member 34, the ultrasound probe 55 tilts with respect to the imaging surface 40A of the imaging table 40 according to the deflection of the compression member 34. Specifically, in a case in which the compression member 34 is not deflected, an angle formed by a perpendicular line P to the imaging surface 40A of the imaging table 40 and a center line L of the ultrasound probe 55, that is, a deflection angle θ, is 0 degrees. In this case, since the ultrasound image U captured using the ultrasound probe 55 is an image along the center line L of the ultrasound probe 55, the ultrasound image U is a cross-sectional image of a plane that can be considered perpendicular to the imaging surface 40A of the imaging table 40. On the other hand, in a case in which the compression member 34 is deflected, the angle formed by the perpendicular line P to the imaging surface 40A of the imaging table 40 and the center line L of the ultrasound probe 55, that is, the deflection angle θ, exceeds 0°. In this case, since the ultrasound image U captured using the ultrasound probe 55 is an image along the center line L of the ultrasound probe 55, the ultrasound image U becomes a cross-sectional image of a plane having a deflection angle θ with respect to the imaging surface 40A of the imaging table 40.

A technology for reconstructing a three-dimensional ultrasound image of a breast W or a cross-sectional image (two-dimensional image) of a plane parallel to the imaging surface 40A of the imaging table 40, which corresponds to a tomographic image of a radiation image X, by reconstructing a plurality of ultrasound images U, is known. As described above, in a case in which the compression member 34 is deflected, the captured ultrasound image U is not a cross-sectional image of a plane that can be considered perpendicular to the imaging surface 40A of the imaging table 40 as described above. Therefore, a three-dimensional ultrasound image or a cross-sectional image generated by directly reconstructing a plurality of ultrasound images U may become an image of a plane that is non-parallel to the imaging surface 40A of the imaging table 40.

Therefore, the image correction unit 74 of the present embodiment detects the deflection angle θ with the tilt detection sensor 57 of the ultrasound probe 55, and corrects the ultrasound image U obtained by imaging into an ultrasound image U of a plane perpendicular to the imaging surface 40A of the imaging table 40 based on the deflection angle θ. As an example, as shown in FIG. 8, the image correction unit 74 of the present embodiment performs affine transformation on each pixel u (four pixels u1 to u4 are shown in FIG. 8) in the depth direction of the ultrasound image U based on the deflection angle θ, and converts the XY coordinates into coordinates on a plane parallel to the imaging surface 40A of the imaging table 40. The image correction unit 74 corrects each of the plurality of ultrasound images U based on the deflection angle θ in this way, and then outputs the plurality of corrected ultrasound images U to the image generation unit 76.

The image generation unit 76 reconstructs the plurality of ultrasound images U corrected by the image correction unit 74 as described above, and generates at least one of a cross-sectional image or a three-dimensional ultrasound image of a plane that can be considered parallel to the imaging surface 40A of the imaging table 40. In the present embodiment, at least one of the cross-sectional image or the three-dimensional ultrasound image of these ultrasound images U is an example of a corrected ultrasound image of the present disclosure. Hereinafter, for simplification of description, a case in which the image generation unit 76 generates a three-dimensional ultrasound image will be described. The image generation unit 76 outputs the generated three-dimensional ultrasound image to the association unit 78.

The association unit 78 associates the three-dimensional ultrasound image generated by the image generation unit 76 with the radiation image X acquired by the radiation image acquisition unit 70. As described above, even in a case in which the radiation image X of the breast W is captured in a compression state by the compression member 34, it is possible to obtain an image that can be considered parallel to the imaging surface 40A regardless of the deflection of the compression member 34. Therefore, the radiation image X associated with the three-dimensional ultrasound image by the association unit 78 may not be subjected to correction based on the deflection of the compression member 34, that is, correction based on the correction information. In other words, the association unit 78 associates a three-dimensional ultrasound image generated from a plurality of ultrasound images U that have been corrected based on the deflection of the compression member 34 with a radiation image X that has not been corrected based on the deflection of the compression member 34. Note that although the radiation image X is not corrected based on the deflection of the compression member 34 in this way, image processing such as contrast adjustment and noise removal processing may be performed. Note that the method by which the association unit 78 associates the three-dimensional ultrasound image with the radiation image X is not particularly limited, for example, identification information indicating a correspondence relationship may be provided to each of the three-dimensional ultrasound image and the radiation image X.

Further, for example, the association unit 78 may associate the three-dimensional ultrasound image with the radiation image X by combining the three-dimensional ultrasound image and the radiation image X into one image. The association unit 78 outputs the three-dimensional ultrasound image and the radiation image X in a state of association via the I/F unit 64, and causes the image storage system 19 to store the output three-dimensional ultrasound image and radiation image X while maintaining the correspondence relationship. Furthermore, the association unit 78 outputs the associated three-dimensional ultrasound image and radiation image X to the display controller 79.

The display controller 79 causes the display unit 68 to display the three-dimensional ultrasound image and the radiation image X. Note that, it is preferable that the display controller 79 causes the display unit 68 to display the three-dimensional ultrasound image and the radiation image X such that the user can easily recognize a correspondence relationship between the three-dimensional ultrasound image and the radiation image X, specifically, a correspondence relationship with the coordinates in the imaging surface 40A of the imaging table 40.

Figure 9:
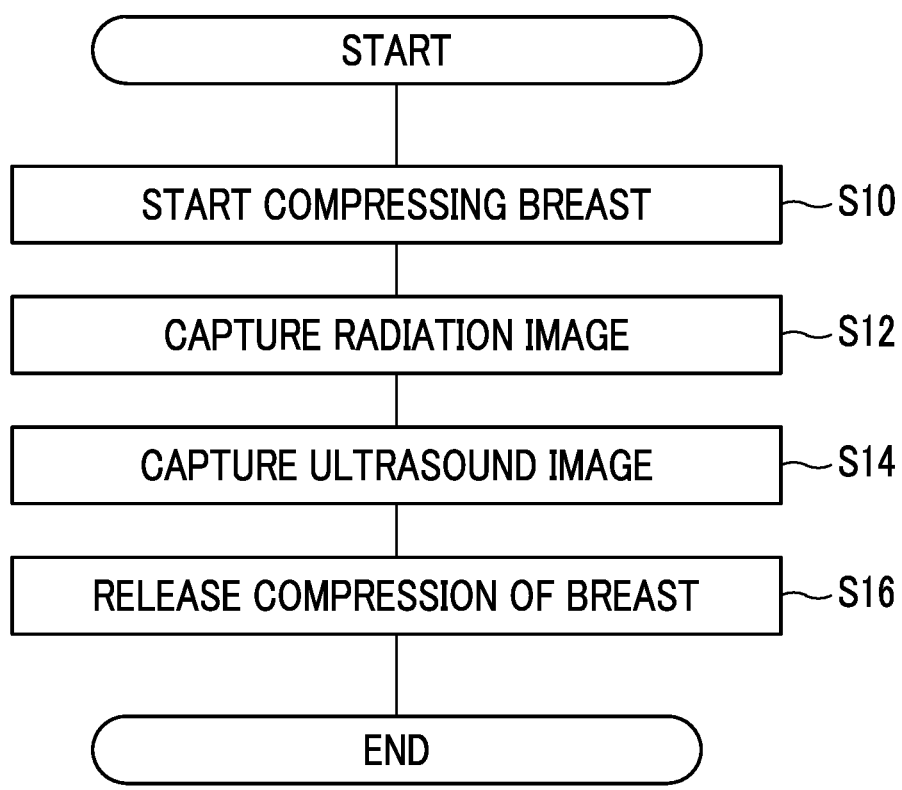
FIG. 9 is a flowchart showing an example of a flow of capturing a radiation image and an ultrasound image using the image capturing system according to the first embodiment.

Next, the operation of the image processing apparatus 18 according to the present embodiment will be described with reference to the drawings. First, the flow of capturing the radiation image X and the ultrasound image U using the image capturing system 1 will be described. FIG. 9 is a flowchart showing an example of a flow of capturing the radiation image X and the ultrasound image U using the image capturing system 1 according to the present embodiment.

First, the user positions the breast W of the examinee as a subject on the imaging surface 40A of the imaging table 40. In a case in which the positioning is completed, the user inputs an instruction to compress the breast W using the operation unit 26. Therefore, in Step S10 of FIG. 9, the controller 20 of the mammography apparatus 10 starts compressing the breast W using the compression member 34. Specifically, in a case in which an instruction to compress the breast W is received, the controller 20 moves the compression member 34 in the compression direction, and puts the breast W into a compression state between the compression member 34 and the imaging surface 40A of the imaging table 40.

In the next Step S12, the mammography apparatus 10 captures the radiation image X of the breast W. Specifically, the user operates an irradiation switch included in the operation unit 26 to irradiate the breast W with the radiation R emitted from the radiation source 36R and to capture the radiation image X with the radiation detector 30. The radiation image X captured by the mammography apparatus 10 is output to the console 12, is output from the console 12 to the image storage system 19 at a predetermined timing, and is stored in the image storage system 19.

In the next Step S14, the radiology technician scans the ultrasound probe 55 of the ultrasonography apparatus 16 to capture a plurality of ultrasound images U of the breast W in a compression state by the compression member 34. Specifically, after capturing the radiation image X, the user applies an acoustic matching member (not shown), such as echo jelly, onto the upper surface 34A of the compression member 34. Further, the user operates the ultrasound probe 55 to scan the upper surface 34A of the compression member 34 covered by the acoustic matching member with ultrasound, thereby capturing a plurality of ultrasound images U.

The compression member 34 of the present embodiment has a fixed end on one side. Specifically, as shown in FIG. 2, a side connected to the compression unit 46 is the fixed end. In the present embodiment, the ultrasound probe 55 is caused to perform scanning in a direction intersecting a line connecting a fixed end of the compression member 34 and a free end opposite to the fixed end, that is, in an intersecting direction of the subject, thereby acquiring a plurality of ultrasound images U. The compression member 34 is substantially only tilted in a direction connecting a fixed end and a free end of the compression member 34, that is, in the front-rear direction of the examinee, and the compression member 34 is deflected in the left-right direction of the examinee. Therefore, in consideration of the deflection direction, by causing the ultrasound probe 55 to perform scanning in the left-right direction of the examinee and obtaining a plurality of ultrasound images U, the correction by the image correction unit 74 can be easily performed. The ultrasound image U captured by the ultrasonography apparatus 16 is temporarily stored in the storage unit 52, is then output from the ultrasonography apparatus 16 to the image storage system 19 at a predetermined timing, and is stored in the image storage system 19.

In a case in which the capturing of the ultrasound image U ends, in the next Step S16, the compression of the breast W using the compression member 34 is released. Specifically, the user gives an instruction to release compression using the operation unit 26. In a case in which the release of the compression of the breast W is received, the controller 20 moves the compression member 34 in the decompression direction, moves the compression member 34 in a direction away from the imaging surface 40A of the imaging table 40, and releases the compression of the breast W using the compression member 34. In this way, in a case in which the process of Step S16 ends, the continuous imaging of the radiation image X and the ultrasound image U ends. In the present embodiment, as in the flow shown in FIG. 9, continuously capturing the radiation image X and the ultrasound image U while the breast W is kept in a compression state by the compression member 34 may be referred to as "continuous imaging". The order of capturing the radiation image X (Step S12 in FIG. 9) and capturing the ultrasound image U (Step S14 in FIG. 9) is not limited. However, from the viewpoint of reducing the compression time of the breast W, it is preferable to perform the capturing of the radiation image X first as in the present embodiment. In addition, the compression force with which the breast W is compressed by the compression member 34 may be weakened as long as it can be considered that there is no change in the compression state of the breast W between the capturing of the radiation image X and the capturing of the ultrasound image U. For example, the compression force by the compression member 34 may be weakened as long as that it can be considered that no change has occurred in the degree of expansion of the mammary glands of the breast W.

Figure 10:
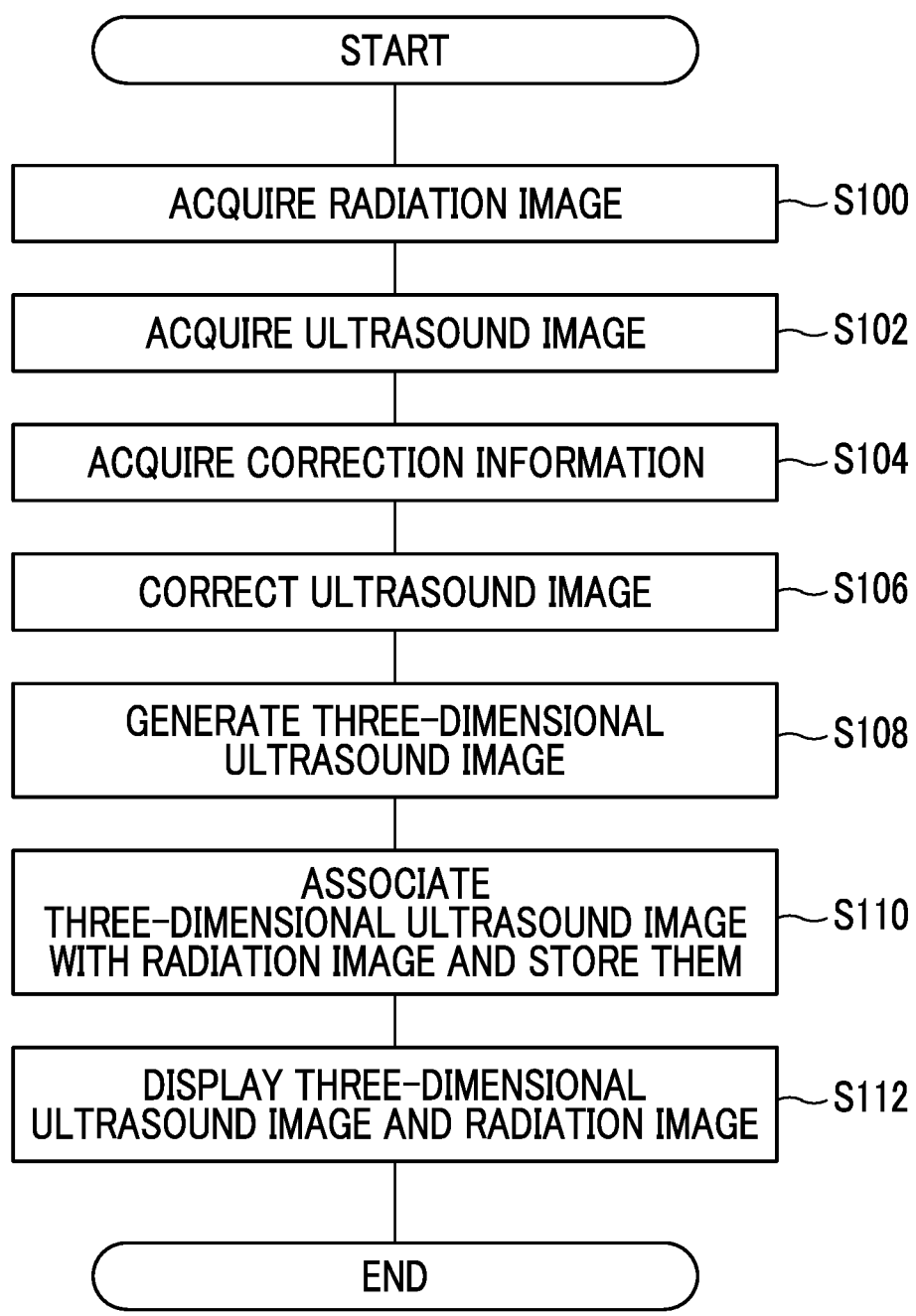
FIG. 10 is a flowchart showing an example of a flow of image processing in the image processing apparatus according to the first embodiment.

In a case in which the continuous imaging of the radiation image X and the ultrasound image U ends in this way, the image processing by the image processing apparatus 18 is performed. As an example, as described above, in a case in which the image processing apparatus 18 according to the present embodiment receives the display conditions for the radiation image X and ultrasound image U that the user wants to display, which are input by the user using the operation unit 66, are received, the CPU 60A of the controller 60 executes the image processing program 61 stored in the ROM 60B to execute image processing, an example of which is shown in FIG. 10. FIG. 10 is a flowchart showing an example of a flow of image processing in the image processing apparatus 18 according to the present embodiment.

First, in Step S100, the radiation image acquisition unit 70 acquires the radiation image X that satisfies the display conditions from the image storage system 19, as described above. In the next Step S102, the ultrasound image acquisition unit 71 acquires the ultrasound image U that satisfies the display conditions from the image storage system 19, as described above. Through the processes of Steps S100 and S102, the image processing apparatus 18 acquires a set of radiation images X and ultrasound images U obtained by continuous imaging.

In the next Step S104, the correction information acquisition unit 72 acquires the detection result S from the tilt detection sensor 57 of the ultrasonography apparatus 16 as correction information, as described above. As an example, as described above, the correction information acquisition unit 72 of the present embodiment acquires, as the detection result S, that is, the correction information, the tilt angle of the ultrasound probe 55 detected by the tilt detection sensor 57 as the deflection angle θ of the compression member 34.

In the next Step S106, the image correction unit 74 corrects each of the plurality of ultrasound images U based on the correction information, as described above. Specifically, as described above, the image correction unit 74 of the present embodiment corrects the ultrasound image U by performing affine transformation on each of the plurality of ultrasound images U based on the deflection angle θ of the compression member 34 which is the correction information.

In the next Step S108, the image generation unit 76 reconstructs the plurality of corrected ultrasound images U to generate a three-dimensional ultrasound image, as described above.

In the next Step S110, the association unit 78 associates the radiation image X acquired in Step S100 with the three-dimensional ultrasound image generated in Step S108, as described above. Further, the association unit 78 causes the image storage system 19 to store the radiation image X and the three-dimensional ultrasound image in a state in which they are associated with each other.

In the next Step S112, the display controller 79 causes the display unit 68 to display the radiation image X and the three-dimensional ultrasound image associated with each other in Step S110, as described above. In a case in which the process of Step S112 ends, the image processing shown in FIG. 10 ends.

Second Embodiment

Another embodiment of the technology of the present disclosure will be described below.

In addition, in the present embodiment, the overall configuration of the image capturing system 1 and the configurations and operations of the mammography apparatus 10, the console 12, the ultrasonography apparatus 16, and the image storage system 19 are the same as those in the first embodiment. Therefore, the description thereof will be omitted.

On the other hand, in the present embodiment, since the functions and operations of the image processing apparatus 18 are different from those of the image processing apparatus 18 according to the first embodiment, the image processing apparatus 18 will be described in detail. Note that the hardware configuration of the image processing apparatus 18 is the same as that in the image processing apparatus 18 (see FIG. 4) according to the first embodiment. Therefore, the description of the hardware configuration will be omitted.

Figure 11:
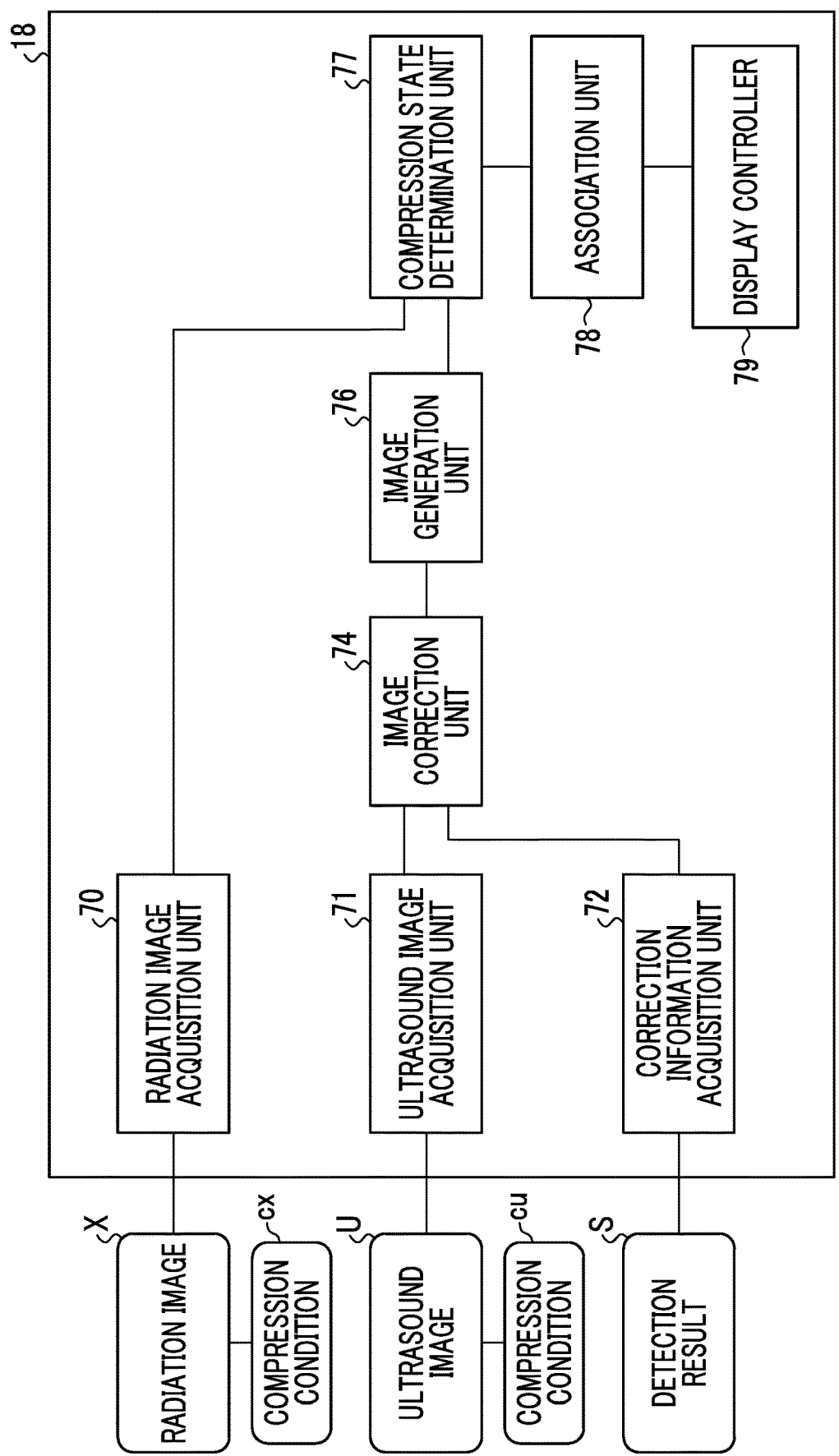
FIG. 11 is a functional block diagram showing an example of the configuration of an image processing apparatus according to a second embodiment.

FIG. 11 is a functional block diagram showing an example of the functions of the image processing apparatus 18 according to the present embodiment. The image processing apparatus 18 according to the present embodiment comprises the radiation image acquisition unit 70, the ultrasound image acquisition unit 71, the correction information acquisition unit 72, the image correction unit 74, the image generation unit 76, a compression state determination unit 77, the association unit 78, and the display controller 79. As an example, in the image processing apparatus 18 according to the present embodiment, the CPU 60A of the controller 60 executes the image processing program 61, and thereby the CPU 60A functions as the radiation image acquisition unit 70, the ultrasound image acquisition unit 71, the correction information acquisition unit 72, the image correction unit 74, the image generation unit 76, the compression state determination unit 77, the association unit 78, and the display controller 79.

As shown in FIG. 11, the radiation image X of the present embodiment is associated with a compression condition cx of the breast W in a case in which the radiation image X is captured. The compression condition cx of the present embodiment represents a condition in a case in which the radiation image X is compressed by the compression member 34 in the mammography apparatus 10 and is a condition related to a compression state of the breast W. In the present embodiment, in a case in which the compression conditions are the same, it can be considered that compression states of the breast W are the same. Specific examples of the compression condition cx include a pressure with which the breast W is compressed by the compression member 34, a type of the compression member 34, a distance between the compression member 34 and the imaging surface 40A of the imaging table 40, and the like.

Therefore, the radiation image acquisition unit 70 of the present embodiment acquires the radiation image X and the compression condition cx associated with the radiation image X, and outputs the acquired radiation image X and compression condition cx to the compression state determination unit 77.

Further, as shown in FIG. 11, the ultrasound image U of the present embodiment is associated with a compression condition cu of the breast W in a case in which the ultrasound image U is captured. In addition, in the present embodiment, even in a case in which only the ultrasound image U is captured, the mammography apparatus 10 is used and the ultrasound image U is captured in a state in which the breast W is compressed by the compression member 34. Furthermore, in the present embodiment, in order to compare the compression condition cu with the compression condition cx, the compression condition cu is set to be the same as the compression condition cx.

Therefore, the ultrasound image acquisition unit 71 of the present embodiment acquires the ultrasound image U and the compression condition cu associated with the ultrasound image U, and outputs the acquired ultrasound image U and compression condition cu to the image correction unit 74.

As described above in the first embodiment, the correction information acquisition unit 72 acquires, as correction information, a detection result S that is a deflection angle θ corresponding to the tilt angle of the ultrasound probe 55, which is tilted according to the deflection of the compression member 34 that is deflected by compressing the breast W, and outputs the acquired detection result S to the image correction unit 74.

As described above in the first embodiment, the image correction unit 74 corrects each of the plurality of ultrasound images U to form a cross-sectional image of a plane perpendicular to the imaging surface 40A of the imaging table 40, based on the deflection angle θ due to the deflection of the compression member 34. The image correction unit 74 outputs the plurality of corrected ultrasound images U and the compression condition cu to the image generation unit 76.

As described above in the first embodiment, the image generation unit 76 reconstructs the plurality of ultrasound images U corrected by the image correction unit 74 to generate a three-dimensional ultrasound image. The image generation unit 76 outputs the generated three-dimensional ultrasound image and the compression condition cu to the compression state determination unit 77.

The compression state determination unit 77 determines whether or not the compression state of the breast W in the capturing of the radiation image X and the compression state of the breast W in the capturing of the ultrasound image U are the same. In a case in which the radiation image X and the ultrasound image U are continuously captured, the compression state determination unit 77 of the present embodiment determines that the compression states of the breast W in the capturing of the radiation image X and the ultrasound image U can be considered to be the same. Further, in a case in which the compression condition cx and the compression condition cu are compared, and the compression condition cx and the compression condition cu can be considered to be the same, the compression state determination unit 77 of the present embodiment determines that the compression state of the breast W in the capturing of the ultrasound image U can be considered to be the same. The compression state determination unit 77 outputs the determination result to the association unit 78.

In a case in which the determination result of the compression state determination unit 77 is a determination result indicating that the compression states can be considered to be the same, the association unit 78 associates the radiation image X with the three-dimensional ultrasound image, as described above in the first embodiment.

The display controller 79 causes the display unit 68 to display the radiation image X and the three-dimensional ultrasound image. Note that, as described above in the first embodiment, in a case in which the radiation image X and the three-dimensional ultrasound image are associated with each other, it is preferable to display the correspondence relationship in a manner that is easy for the user to recognize. On the other hand, in a case in which the radiation image X and the three-dimensional ultrasound image are not associated with each other, it is preferable to also present to the user that the association cannot be made, that is, that the compression states during imaging are different.

Next, an example of a flow of capturing the radiation image X and the ultrasound image U using the image capturing system 1 according to the present embodiment will be described. As a method of capturing the radiation image X and the ultrasound image U, as described above in the first embodiment, the continuous imaging (see FIG. 9) may be performed. Further, in the present embodiment, the continuous imaging also includes the following cases. Specifically, the radiation image X and the ultrasound image U may be captured separately based on each of the imaging flow shown in FIG. 12A for capturing only the radiation image X and the imaging flow shown in FIG. 12B for capturing only the ultrasound image U. Specifically, as shown in FIG. 12A, only the processes of Steps S10, S12, and S16 in the imaging flow shown in FIG. 9 are performed, the breast W is put into a compression state by the compression member 34 in the mammography apparatus 10, only the radiation image X of the breast W is captured, and then the compression state is released. Before or after the radiation image X is captured, as shown in FIG. 12B, only the processes of Steps S10, S14, and S16 in the imaging flow shown in FIG. 9 are performed, the breast W is put into a compression state by the compression member 34 in the mammography apparatus 10, only the ultrasound image U of the breast W is captured, and then the compression state is released. As long as the compression states of the breast W in the imaging are the same, the mammography apparatus 10 used to capture the radiation image X and the mammography apparatus 10 used to compress the breast W in the case of capturing the ultrasound image U may not be the same. Further, as long as the compression states of the breast W in the imaging are the same, the apparatus used to compress the breast W in the case of capturing the ultrasound image U may be an apparatus other than the mammography apparatus.

Figure 13:
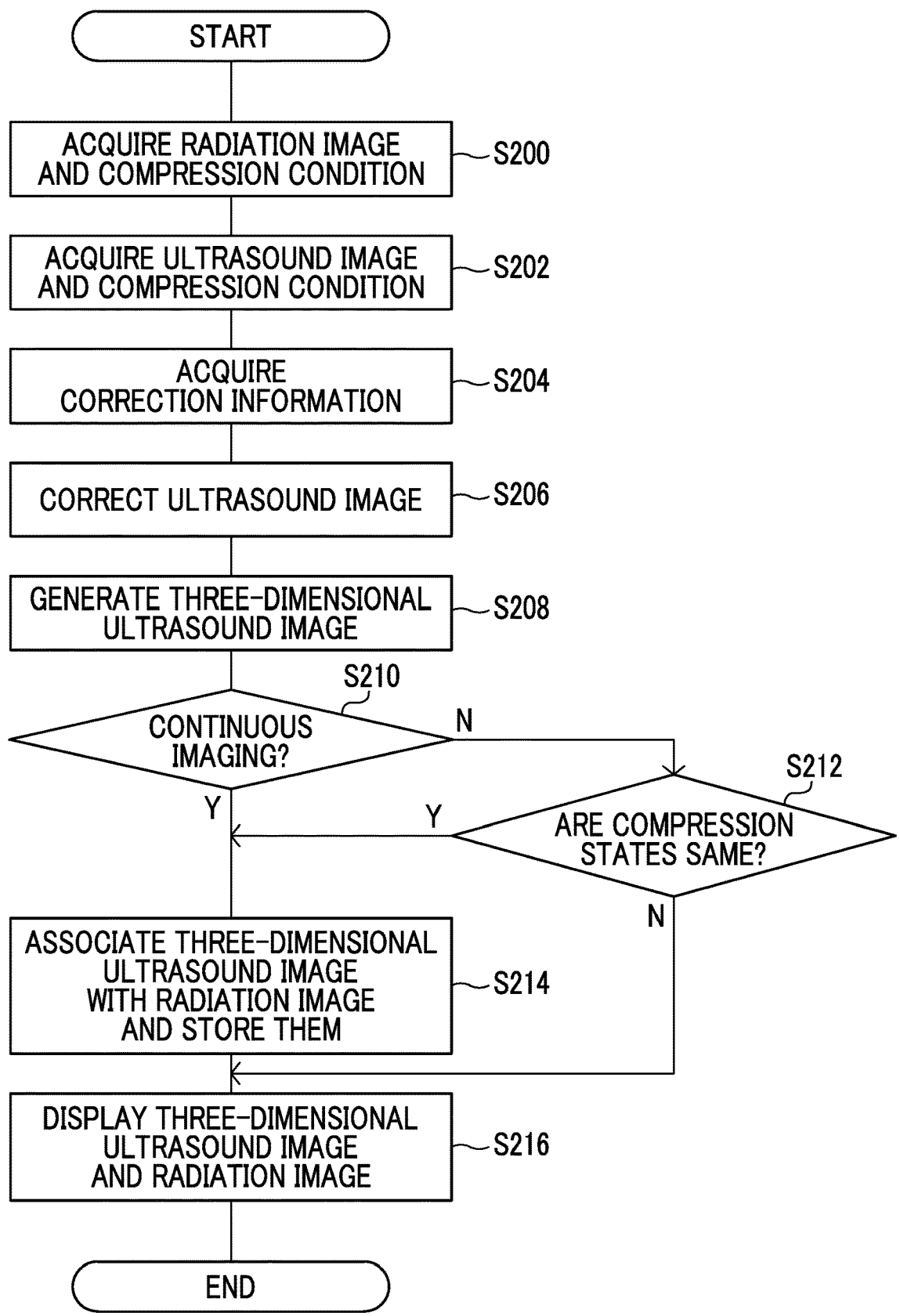
FIG. 13 is a flowchart showing an example of a flow of image processing in the image processing apparatus according to the second embodiment.

Next, the operation of the image processing apparatus 18 according to the present embodiment will be described. FIG. 13 is a flowchart showing an example of a flow of image processing in the image processing apparatus 18 according to the present embodiment.

First, in Step S200, the radiation image acquisition unit 70 acquires the radiation image X and the compression condition cx that satisfy the display conditions from the image storage system 19, as described above. In the next Step S202, the ultrasound image acquisition unit 71 acquires the ultrasound image U and the compression condition cu that satisfy the display conditions from the image storage system 19, as described above. Note that, in this case, the display conditions for acquiring the radiation image X and the display conditions for acquiring the ultrasound image U may be the same or different.

In the next Step S204, the correction information acquisition unit 72 acquires the detection result S from the tilt detection sensor 57 of the ultrasonography apparatus 16 as correction information, similarly to Step S104 of the image processing of the first embodiment (see FIG. 10).

In the next Step S206, the image correction unit 74 corrects each of the plurality of ultrasound images U based on the correction information, similarly to Step S106 of the image processing of the first embodiment (see FIG. 10).

In the next Step S208, the image generation unit 76 reconstructs the plurality of corrected ultrasound images U to generate a three-dimensional ultrasound image, similarly to Step S108 of the image processing of the first embodiment (see FIG. 10).

In the next Step S210, the compression state determination unit 77 determines whether or not the radiation image X acquired in Step S200 and the ultrasound image U acquired in Step S202 are obtained by continuous imaging. In a case in which the images are obtained by the continuous imaging, the determination in Step S210 is affirmative, and the process proceeds to Step S214.

In Step S214, the association unit 78 associates the radiation image X acquired in Step S200 with the three-dimensional ultrasound image generated in Step S208, similarly to Step S110 of the image processing of the first embodiment (see FIG. 10). Further, the association unit 78 causes the image storage system 19 to store the radiation image X and the three-dimensional ultrasound image in a state in which they are associated with each other, and then the process proceeds to Step S216.

On the other hand, in a case in which the radiation image X and the ultrasound image U are not obtained by continuous imaging, the determination in Step S210 is negative, and the process proceeds to Step S212. In Step S212, the compression state determination unit 77 determines whether or not the compression states of the breast W can be considered to be the same, as described above. Specifically, in the present embodiment, the compression state determination unit 77 determines whether or not the compression condition cx of the breast W in the capturing of the radiation image X and the compression condition cu of the breast W in the capturing of the ultrasound image U can be considered to be the same. In a case in which the compression condition cx and the compression condition cu can be considered to be the same, the determination in Step S212 is affirmative, and the process proceeds to Step S214. On the other hand, in a case in which the compression condition cx and the compression condition cu cannot be considered to be the same, the determination in Step S212 is negative, and the process proceeds to Step S216.

In Step S216, the display controller 79 causes the display unit 68 to display the radiation image X and the three-dimensional ultrasound image, as described above. In a case in which the process of Step S216 ends, the image processing shown in FIG. 13 ends.

Figure 14:
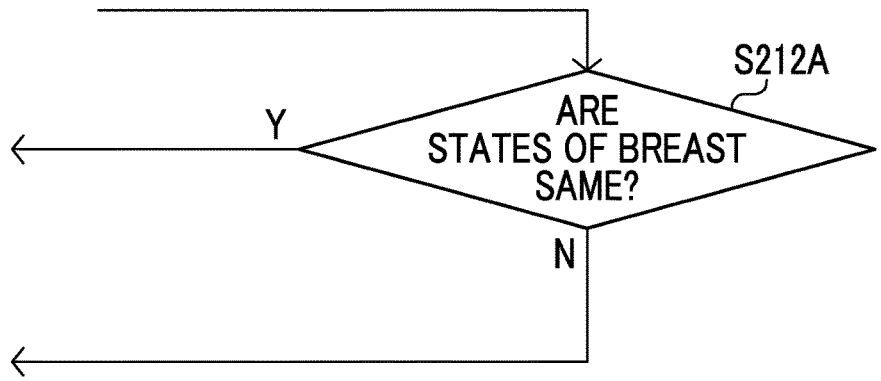
FIG. 14 is a flowchart showing another example of a flow of image processing in the image processing apparatus according to the first embodiment.

The method in which the compression state determination unit 77 considers that the compression states of the breast W in the capturing of the radiation image X and the ultrasound image U are the same is not limited to the method based on whether or not the compression condition cx and the compression condition cu described above are the same. For example, in a case in which a state of the breast W in the compression state in the capturing of the radiation image X and a state of the breast W in the compression state in the capturing of the ultrasound image U are the same, a method may be used in which the compression states of the breast W in the capturing of the radiation image X and the ultrasound image U are considered to be the same. In this case, the process of Step S212 of the image processing shown in FIG. 13 only needs to be replaced with the process of Step S212A shown in FIG. 14. In Step S212A, the compression state determination unit 77 determines whether or not the state of the breast W in the compression state in the capturing of the radiation image X and the state of the breast W in the compression state in the capturing of the ultrasound image U are the same. The method by which the compression state determination unit 77 determines whether or not the states of the breast W are the same is not particularly limited. For example, a method may be used in which the determination is made based on whether or not at least one of the thickness of the breast W in a compression state by the compression member 34, the contact area between the breast W in the compression state and the imaging surface 40A of the imaging table 40, or the contact area between the breast W in the compression state and the compression member 34 is the same.

Further, for example, a three-dimensional ultrasound image generated from the ultrasound image U out of the radiation image X and the ultrasound image U obtained by continuous imaging may be configured to be associated with a separately captured radiation image X. In this case, the compression state determination unit 77 uses the radiation image X obtained by the continuous imaging as a reference (hereinafter, referred to as a "reference radiation image KX"), and in a case in which a degree of similarity between the reference radiation image KX and a separately captured radiation image X satisfies a predetermined criterion, it can be considered that the compression states of the breast W are the same. The predetermined criterion includes a case in which the degree of similarity is equal to or greater than a threshold value, or the like, and it is preferable to determine what specifically to focus on in the radiation image X to determine the degree of similarity based on the content that changes depending on the compression state. Examples thereof include the degree of similarity in the position of the skin line in the breast W, the area of the breast W portion, the degree of expansion of the mammary glands, and the like, in the radiation image X.

As described above, in the image processing apparatus 18 according to the present embodiment, even in the radiation image X and the ultrasound image U, which are not continuously captured, in a case in which the compression states of the breast W during the imaging can be considered to be the same, the radiation image X and the ultrasound image U are associated with each other. However, in this case, in a case in which the states of the breast W itself are not the same between when the radiation image X is captured and when the ultrasound image U is captured, there are cases where it is not preferable to associate the radiation image X with the three-dimensional ultrasound image. Examples of such states of the breast W itself include the hardness and size of the breast W. In general, even the breasts W of the same examinee in the same direction may have different hardness and size depending on the day. In this case, for example, even in a case in which the compression conditions are the same, the states of the breast W in the compression state may differ. Further, for example, examples of the states of the breast W itself include a state of an internal structure of the breast W such as a mammary gland, a calcification, and a tumor.

Figure 15:
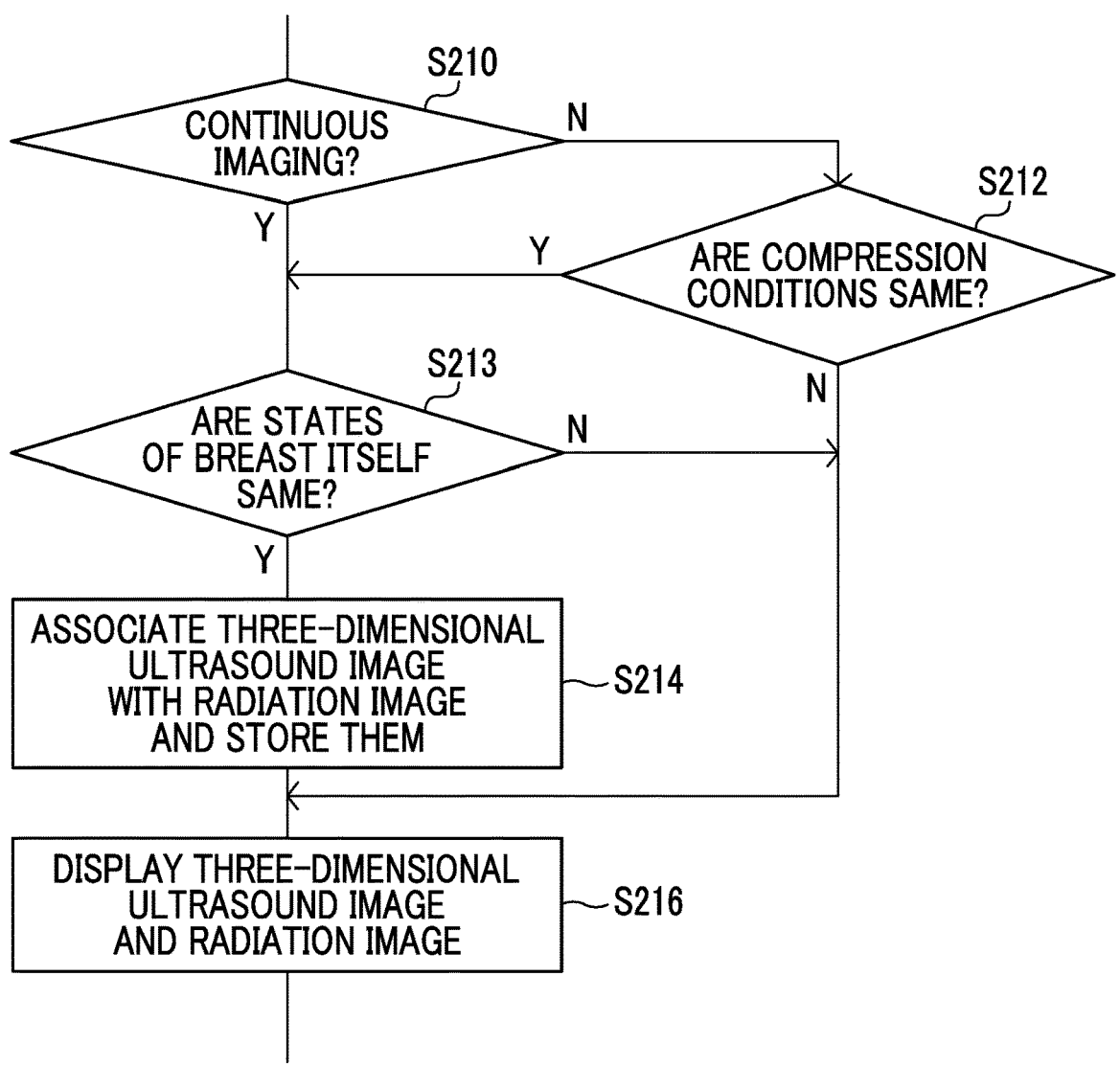
FIG. 15 is a flowchart showing another example of a flow of image processing in the image processing apparatus according to the first embodiment.

In this way, an example will be described in which, in a case in which the states of the breast W itself are not the same between when the radiation image X is captured and when the ultrasound image U is captured, the radiation image X and the three-dimensional ultrasound image are not associated with each other. In this case, similarly to the compression condition cx, the radiation image X is associated with the information indicating the state of the breast W itself in a case in which the radiation image X is captured, and the radiation image acquisition unit 70 acquires the information indicating the state of the breast W itself as well as the radiation image X. Further, similarly to the compression condition cu, the ultrasound image U is associated with the information indicating the state of the breast W itself in a case in which the ultrasound image U is captured, and the ultrasound image acquisition unit 71 acquires the information indicating the state of the breast W itself as well as the ultrasound image U. The association unit 78 compares the information indicating the state of the breast W itself in a case in which the radiation image X is captured with the information indicating the state of the breast W itself in a case in which the ultrasound image U is captured, and associates the radiation image X and the three-dimensional ultrasound image with each other in a case in which the both can be considered to be the same. As shown in FIG. 15, the image processing in this case includes process of Step S213 before Step S214 of the image processing shown in FIG. 13. That is, in a case in which the determination is affirmative in Step S210 and in a case in which the determination is affirmative in Step S212, the process proceeds to Step S213. In Step S213, as described above, the association unit 78 determines whether or not the state of the breast W itself in a case in which the radiation image X is captured and the state of the breast W itself in a case in which the ultrasound image U is captured can be considered to be the same. In a case in which the states can be considered to be the same, the determination in Step S213 is affirmative, and the process proceeds to Step S214. On the other hand, in a case in which the states cannot be considered to be the same, the determination in Step S213 is negative, and the process proceeds to Step S216. Thereby, in the image processing apparatus 18, in a case in which the compression states are the same and the states of the breast W itself are the same, the radiation image X and the three-dimensional ultrasound image are associated with each other.

Third Embodiment

Another embodiment of the technology of the present disclosure will be described below. Specifically, in the present embodiment, an aspect will be described in which the image processing apparatus 18 associates a three-dimensional ultrasound image generated from the ultrasound images U obtained by continuous imaging with a separately captured radiation image X.

In addition, in the present embodiment, the overall configuration of the image capturing system 1 and the configurations and operations of the mammography apparatus 10, the console 12, the ultrasonography apparatus 16, and the image storage system 19 are the same as those in the first embodiment. Therefore, the description thereof will be omitted.

On the other hand, in the present embodiment, since the functions and operations of the image processing apparatus 18 are different from those of the image processing apparatus 18 according to the first embodiment, the image processing apparatus 18 will be described in detail. Note that the hardware configuration of the image processing apparatus 18 is the same as that in the image processing apparatus 18 (see FIG. 4) according to the first embodiment. Therefore, the description of the hardware configuration will be omitted.

Figure 16:
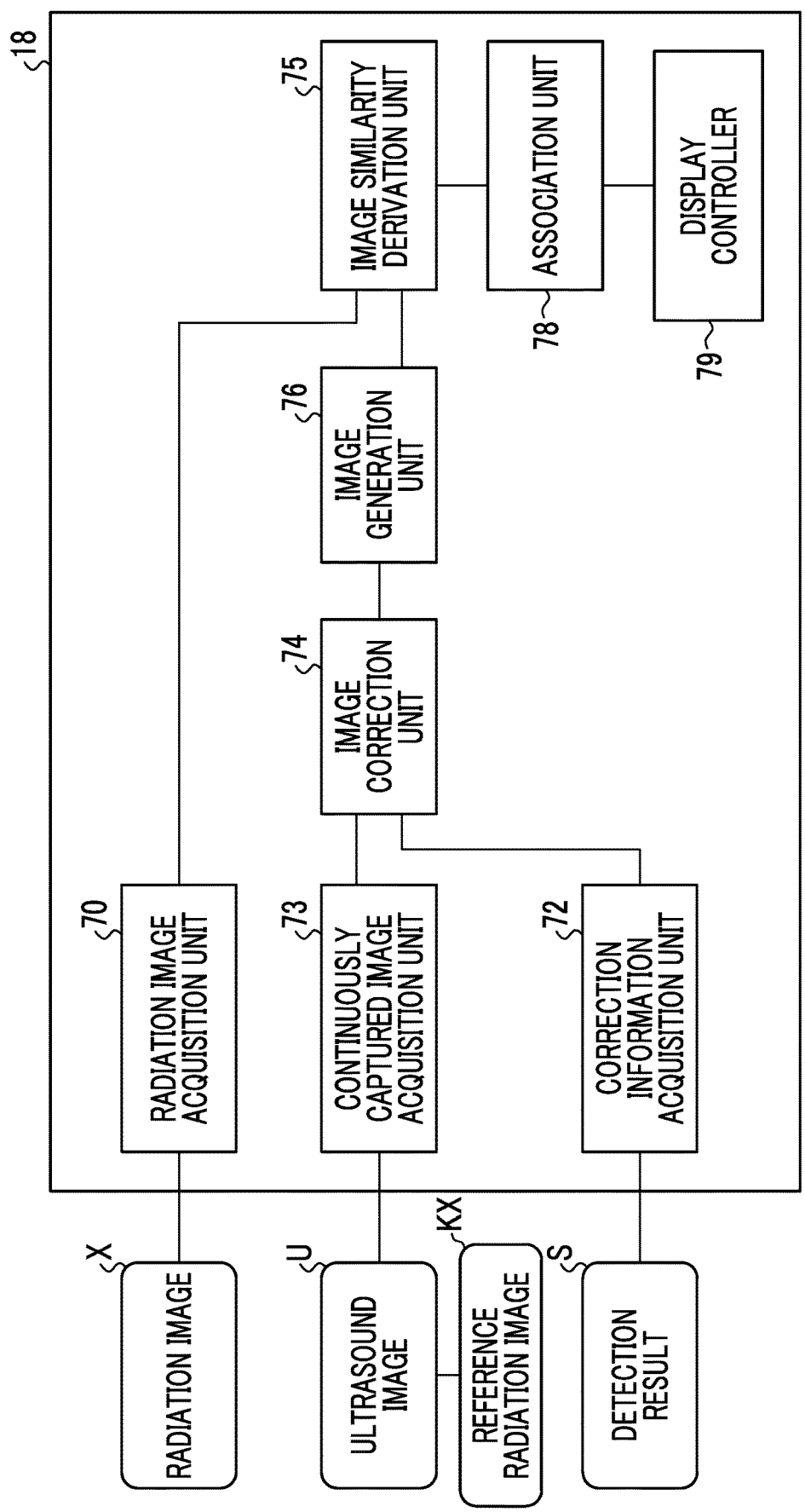
FIG. 16 is a functional block diagram showing an example of the configuration of the image processing apparatus according to the second embodiment.

FIG. 16 is a functional block diagram showing an example of the functions of the image processing apparatus 18 according to the present embodiment. The image processing apparatus 18 according to the present embodiment comprises the radiation image acquisition unit 70, a continuously captured image acquisition unit 73, the correction information acquisition unit 72, the image correction unit 74, the image generation unit 76, an image similarity derivation unit 75, the association unit 78, and the display controller 79. As an example, in the image processing apparatus 18 according to the present embodiment, the CPU 60A of the controller 60 executes the image processing program 61, and thereby the CPU 60A functions as the radiation image acquisition unit 70, the continuously captured image acquisition unit 73, the correction information acquisition unit 72, the image correction unit 74, the image generation unit 76, the image similarity derivation unit 75, the association unit 78, and the display controller 79.

As described above in the first embodiment, the radiation image acquisition unit 70 of the present embodiment acquires a radiation image X and outputs the acquired image to the image similarity derivation unit 75.

The continuously captured image acquisition unit 73 acquires a reference radiation image KX and a plurality of ultrasound images U that are obtained by the continuous imaging, and outputs the acquired images to the image correction unit 74.

As described above in the first embodiment, the correction information acquisition unit 72 acquires, as correction information, a detection result S that is a deflection angle θ corresponding to the tilt angle of the ultrasound probe 55, which is tilted according to the deflection of the compression member 34 that is deflected by compressing the breast W, and outputs the acquired detection result S to the image correction unit 74.

As described above in the first embodiment, the image correction unit 74 corrects each of the plurality of ultrasound images U to form a cross-sectional image of a plane perpendicular to the imaging surface 40A of the imaging table 40, based on the deflection angle θ due to the deflection of the compression member 34. The image correction unit 74 outputs the reference radiation image KX and the plurality of corrected ultrasound images U to the image generation unit 76.

As described above in the first embodiment, the image generation unit 76 reconstructs the plurality of ultrasound images U corrected by the image correction unit 74 to generate a three-dimensional ultrasound image. The image generation unit 76 outputs the reference radiation image KX and the generated three-dimensional ultrasound image to the image similarity derivation unit 75.

As described above, the image similarity derivation unit 75 derives the degree of similarity between the reference radiation image KX and the radiation image X. It is preferable to determine the degree of similarity between the radiation images based on the content that changes according to the compression state. Examples of the degree of similarity include the degree of similarity in the position of the skin line in the breast W, the area of the breast W portion, the degree of expansion of the mammary glands, and the like, in the radiation images. The image similarity derivation unit 75 outputs a numerical value indicating the degree of similarity between the reference radiation image KX and the radiation image X to the association unit 78.

The association unit 78 associates the radiation image X with the three-dimensional ultrasound image as described above in the first embodiment in a case in which the degree of similarity derived by the image similarity derivation unit 75 satisfies a predetermined criterion. As an example, in a case in which the degree of similarity is equal to or greater than the threshold value as the predetermined criterion, the association unit 78 of the present embodiment determines that the predetermined criterion is satisfied, and associates the radiation image X with the three-dimensional ultrasound image.

The display controller 79 causes the display unit 68 to display the radiation image X and the three-dimensional ultrasound image. Note that, as described above in the second embodiment, it is preferable to cause the display unit 68 to display the radiation image X and the three-dimensional ultrasound image, as described above.

Next, the operation of the image processing apparatus 18 according to the present embodiment will be described. FIG. 17 is a flowchart showing an example of a flow of image processing in the image processing apparatus 18 according to the present embodiment.

First, in Step S300, the radiation image acquisition unit 70 acquires the radiation image X that satisfies the display conditions from the image storage system 19, as described above. In the next Step S302, the continuously captured image acquisition unit 73 acquires the reference radiation image KX and the plurality of ultrasound images U obtained by the continuous imaging, which satisfy the display conditions, from the image storage system 19, as described above.

In the next Step S304, the correction information acquisition unit 72 acquires the detection result S from the tilt detection sensor 57 of the ultrasonography apparatus 16 as correction information, similarly to Step S104 of the image processing of the first embodiment (see FIG. 10).

In the next Step S306, the image correction unit 74 corrects each of the plurality of ultrasound images U based on the correction information, similarly to Step S106 of the image processing of the first embodiment (see FIG. 10).

In the next Step S308, the image generation unit 76 reconstructs the plurality of corrected ultrasound images U to generate a three-dimensional ultrasound image, similarly to Step S108 of the image processing of the first embodiment (see FIG. 10).

In the next Step S310, as described above, the image similarity derivation unit 75 derives the degree of similarity between the radiation image X acquired in Step S300 and the reference radiation image KX acquired in Step S302.

In the next Step S312, the association unit 78 determines whether or not the degree of similarity derived in Step S310 is equal to or greater than a threshold value. In a case in which the degree of similarity is less than the threshold value, the determination in Step S312 is negative, and the process proceeds to Step S316. On the other hand, in a case in which the degree of similarity is equal to or greater than the threshold value, the determination in Step S312 is affirmative, and the process proceeds to Step S314.

In Step S314, the association unit 78 associates the radiation image X acquired in Step S300 with the three-dimensional ultrasound image generated in Step S308, similarly to Step S110 of the image processing of the first embodiment (see FIG. 10). Further, the association unit 78 causes the image storage system 19 to store the radiation image X and the three-dimensional ultrasound image in a state in which they are associated with each other, and then the process proceeds to Step S316.

In Step S316, the display controller 79 causes the display unit 68 to display the radiation image X and the three-dimensional ultrasound image, as described above. In a case in which the process of Step S316 ends, the image processing shown in FIG. 17 ends.

As described above, with the image processing apparatus 18 according to the first to third embodiments, it is possible to easily compare the radiation image and the ultrasound image of the breast imaged in the compression state.

Note that the method by which the image correction unit 74 of each embodiment corrects each of the plurality of ultrasound images U is not limited to the method described in each of the above embodiments. In order for the image correction unit 74 to correct the plurality of ultrasound images U, it is sufficient that at least one of the tilt of the ultrasound probe 55 or the deflection of the compression member 34 can be acquired as correction information.

As a modification example for acquiring the deflection of the compression member 34, using a sensor that detects the distance between the compression member 34, specifically the upper surface 34A of the compression member 34, and a predetermined position, the distance detected by the sensor can be used as correction information. In this case, the image correction unit 74 derives the deflection angle θ of the compression member 34 from the distance detected by the sensor. Examples of such a sensor include at least one of a time of flight (TOF) camera, a 3D camera, or a laser distance measurement device. Such a sensor may be provided in the mammography apparatus 10 or may be provided outside the mammography apparatus 10.

Further, as the correction information, information indicating the width or the width and thickness of the breast W in the compression state and the pressure for compressing the breast W may be used. In this case, correspondence relationship information indicating a correspondence relationship among the width, or the width and the thickness of the breast W in the compression state, the pressure for compressing the breast W, and the deflection angle θ of the compression member 34 is created in advance. Then, the image correction unit 74 derives the deflection angle θ of the compression member 34 based on the correspondence relationship information and the correction information, and corrects each of the plurality of ultrasound images U based on the deflection angle θ.

Further, the correction information may be information indicating each of the width and the thickness of the breast W in the compression state and the pressure for compressing the breast W. In this case, the image correction unit 74 derives the deflection angle θ of the compression member 34 from the viewpoint of structural mechanics from the width and thickness of the breast W in the compression state and the pressure for compressing the breast W, and corrects each of the plurality of ultrasound images U based on the deflection angle θ. Note that in a case of deriving the deflection angle θ from the viewpoint of structural mechanics, it is preferable to also use the structure of the compression member 34, the Young's modulus of the compression member 34, and the Young's modulus of the breast W. In addition, in a case in which the breast W is a rigid body, it is not necessary to use the thickness of the breast W in the compression state. However, by using the width and thickness of the breast W, it is possible to perform a more advanced correction that also takes deformation of the breast W into consideration. Note that a method for making it possible to use the width and thickness of the breast W in the compression state, the pressure for compressing the breast W, and the like as correction information is not particularly limited. For example, a method for detecting the width and thickness of the breast W in the compression state, the pressure for compressing the breast W, and the like is not particularly limited, and a known method can be used. A specific example of a method for detecting the width of the breast W in the compression state includes a method in which an image analysis is performed on an image obtained by imaging the breast W in the compression state using a visible light camera to detect the width of the breast W. Further, a specific example of a method for detecting the thickness of the breast W in the compression state includes a method for detecting the thickness of the breast W based on the amount of movement of the compression member 34 moved from the initial position in order to compress the breast.

In each of the above embodiments, for example, as hardware structures of processing units that execute various types of processing, such as the radiation image acquisition unit 70, the ultrasound image acquisition unit 71, the correction information acquisition unit 72, the image correction unit 74, the image generation unit 76, the association unit 78, and the display controller 79, various processors shown below can be used. As described above, the various processors include a programmable logic device (PLD) as a processor of which the circuit configuration can be changed after manufacture, such as a field-programmable gate array (FPGA), a dedicated electrical circuit as a processor having a dedicated circuit configuration for executing specific processing such as an application-specific integrated circuit (ASIC), and the like, in addition to the CPU as a general-purpose processor that functions as various processing units by executing software (program).

One processing unit may be configured by one of the various processors, or may be configured by a combination of the same or different types of two or more processors (for example, a combination of a plurality of FPGAs or a combination of the CPU and the FPGA). In addition, a plurality of processing units may be configured by one processor.

As an example in which a plurality of processing units are configured by one processor, first, a form in which one processor is configured by a combination of one or more CPUs and software as typified by a computer, such as a client or a server, and this processor functions as a plurality of processing units can be mentioned. Second, as represented by a system-on-chip (SoC) or the like, a form of using a processor for realizing the function of the entire system including a plurality of processing units with one integrated circuit (IC) chip can be mentioned. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

In each of the above-described embodiments, the image processing program 61 has been described as being stored (installed) in advance in the controller 60 of the image processing apparatus 18; however, the present disclosure is not limited thereto. The image processing program 61 may be provided in a form recorded in a recording medium such as a compact disc read-only memory (CD-ROM), a digital versatile disc read-only memory (DVD-ROM), and a universal serial bus (USB) memory. In addition, the image processing program 61 may be configured to be downloaded from an external device via a network.

In addition, the configurations and operations of the image capturing system 1, the radiography system 2, the mammography apparatus 10, the ultrasonography apparatus 16, the image processing apparatus 18, and the like described in each of the above-described embodiments are merely examples and it goes without saying that they can be changed according to the situation without departing from the gist of the present invention. Furthermore, it goes without saying that the above-described embodiments may be combined as appropriate.

Regarding the above embodiments, the following supplementary notes are further disclosed.

Supplementary Note 1

An image processing apparatus comprising at least one processor,
in which the processor is configured to:
acquire a radiation image and a plurality of continuously captured ultrasound images while a breast is kept in a compression state by a compression member;
acquire correction information related to at least one of a tilt of a probe that has performed scanning on the compression member during the capturing of the plurality of ultrasound images or a deflection of the compression member;
generate a corrected ultrasound image corrected based on the correction information from the plurality of acquired ultrasound images; and
associate the corrected ultrasound image with the radiation image.

Supplementary Note 2

The image processing apparatus according to Supplementary Note 1,
in which the processor is configured to acquire a detection result of a sensor that detects at least one of the tilt of the probe or the deflection of the compression member as the correction information.

Supplementary Note 3

The image processing apparatus according to Supplementary Note 2,
in which the sensor is a sensor provided on the probe for detecting the tilt of the probe.

Supplementary Note 4

The image processing apparatus according to Supplementary Note 3,
in which the sensor is any of a magnetic sensor, a gyro sensor, or an acceleration sensor.

Supplementary Note 5

The image processing apparatus according to Supplementary Note 2,
in which the sensor is a sensor that detects a distance between the compression member and a predetermined position.

Supplementary Note 6

The image processing apparatus according to Supplementary Note 5,
in which the sensor is at least one of a TOF camera, a 3D camera, or a laser distance measurement device.

Supplementary Note 7

The image processing apparatus according to Supplementary Note 1,
in which the correction information includes a thickness and a width of the breast in the compression state and a pressure for compressing the breast, and
the processor is configured to generate the corrected ultrasound image from the plurality of ultrasound images corrected based on the deflection of the compression member specified based on correspondence relationship information indicating a correspondence relationship among the width or the width and the thickness of the breast in the compression state, the pressure for compressing the breast, and information indicating the deflection of the compression member.

Supplementary Note 8

The image processing apparatus according to any one of Supplementary Notes 1 to 7,
in which the processor is configured to correct coordinates of each of the plurality of ultrasound images based on the correction information, and then generate a three-dimensional ultrasound image as the corrected ultrasound image through reconstruction.

Supplementary Note 9

The image processing apparatus according to Supplementary Note 8,
in which the processor is configured to perform affine transformation on each of the plurality of ultrasound images based on a deflection angle of the compression member at an imaging position of each of the plurality of ultrasound images, the deflection angle being obtained based on the correction information.

Supplementary Note 10

The image processing apparatus according to Supplementary Note 9,
in which the correction information includes information indicating each of a width and a thickness of the breast in the compression state and a pressure for compressing the breast, and
the processor is configured to derive the deflection angle from the correction information.

Supplementary Note 11

The image processing apparatus according to any one of Supplementary Notes 1 to 10,
in which the compression member has a fixed end on one side, and
the ultrasound image is obtained by causing the probe to perform scanning in a direction intersecting a line connecting the fixed end and a free end opposite to the fixed end.

Supplementary Note 12

The image processing apparatus according to any one of Supplementary Notes 1 to 11,
in which the radiation image to be associated with the corrected ultrasound image by the processor is not subjected to correction based on the correction information.

Supplementary Note 13

An image processing method executed by a computer, the method comprising:
acquiring a radiation image and a plurality of continuously captured ultrasound images while a breast is kept in a compression state by a compression member;
acquiring correction information related to at least one of a tilt of a probe that has performed scanning on the compression member during the capturing of the plurality of ultrasound images or a deflection of the compression member;
generating a corrected ultrasound image corrected based on the correction information from the plurality of acquired ultrasound images; and
associating the corrected ultrasound image with the radiation image.

Supplementary Note 14

An image processing program for causing a computer to execute:
acquiring a radiation image and a plurality of continuously captured ultrasound images while a breast is kept in a compression state by a compression member;
acquiring correction information related to at least one of a tilt of a probe that has performed scanning on the compression member during the capturing of the plurality of ultrasound images or a deflection of the compression member;
generating a corrected ultrasound image corrected based on the correction information from the plurality of acquired ultrasound images; and
associating the corrected ultrasound image with the radiation image.

Supplementary Note 15

An image processing apparatus comprising at least one processor,
in which the processor is configured to:
acquire a plurality of ultrasound images of a breast imaged in a compression state by a compression member;
acquire correction information related to at least one of a tilt of a probe that has performed scanning on the compression member during the capturing of the plurality of ultrasound images or a deflection of the compression member;
generate a corrected ultrasound image corrected based on the correction information from the plurality of acquired ultrasound images;
acquire a radiation image of the breast through imaging;
determine whether or not a compression state of the breast in the radiation image is considered to be the same as the compression state of the breast in the capturing of the plurality of ultrasound images; and
associate the corrected ultrasound image with the radiation image in a case in which determination is made that the compression states of the breast are considered to be the same.

Supplementary Note 16

The image processing apparatus according to Supplementary Note 15,
in which the processor is configured to determine that, in a case in which the capturing of the plurality of ultrasound images and the capturing of the radiation image are continuously performed while the breast is kept in the compression state by the compression member, the compression states of the breast are considered to be the same.

Supplementary Note 17

The image processing apparatus according to Supplementary Note 15,
in which the processor is configured to determine that, in a case in which compression conditions for putting the breast into the compression state are the same, the compression states of the breast are considered to be the same.

Supplementary Note 18

The image processing apparatus according to Supplementary Note 15,
in which the processor is configured to determine that, in a case in which states of the breast in the compression state are the same, the compression states of the breast are considered to be the same.

Supplementary Note 19

The image processing apparatus according to Supplementary Note 15,
in which the processor is configured to further associate the radiation image with the corrected ultrasound image in a case in which a state of the breast itself in the capturing of the plurality of ultrasound images and a state of the breast itself in the capturing of the radiation image are considered to be the same.

Supplementary Note 20

The image processing apparatus according to Supplementary Note 15,
in which the processor is configured to:
    further acquire a reference radiation image that is captured continuously with the capturing of the plurality of ultrasound images while the breast is kept in the compression state by the compression member; and
    determine that, in a case in which a degree of similarity between the reference radiation image and the radiation image satisfies a predetermined criterion, the compression states of the breast are considered to be the same.

Supplementary Note 21

The image processing apparatus according to Supplementary Note 15,
in which the processor is configured to acquire a detection result of a sensor that detects at least one of the tilt of the probe or the deflection of the compression member as the correction information.

Supplementary Note 22

The image processing apparatus according to Supplementary Note 21,
in which the sensor is a sensor provided on the probe for detecting the tilt of the probe.

Supplementary Note 23

The image processing apparatus according to Supplementary Note 22,
in which the sensor is any of a magnetic sensor, a gyro sensor, or an acceleration sensor.

Supplementary Note 24

The image processing apparatus according to Supplementary Note 21,
in which the sensor is a sensor that detects a distance between the compression member and a predetermined position.

Supplementary Note 25

The image processing apparatus according to Supplementary Note 24,
in which the sensor is at least one of a TOF camera, a 3D camera, or a laser distance measurement device.

Supplementary Note 26

The image processing apparatus according to Supplementary Note 15,
in which the correction information includes a thickness and a width of the breast in the compression state and a pressure for compressing the breast, and
the processor is configured to generate the corrected ultrasound image from the plurality of ultrasound images corrected based on the deflection of the compression member specified based on correspondence relationship information indicating a correspondence relationship among the width or the width and the thickness of the breast in the compression state, the pressure for compressing the breast, and information indicating the deflection of the compression member.

Supplementary Note 27

The image processing apparatus according to any one of Supplementary Notes 15 to 26,
in which the processor is configured to correct coordinates of each of the plurality of ultrasound images based on the correction information, and then generate a three-dimensional ultrasound image as the corrected ultrasound image through reconstruction.

Supplementary Note 28

The image processing apparatus according to Supplementary Note 27,
in which the processor is configured to perform affine transformation on each of the plurality of ultrasound images based on a deflection angle of the compression member at an imaging position of each of the plurality of ultrasound images, the deflection angle being obtained based on the correction information.

Supplementary Note 29

The image processing apparatus according to Supplementary Note 28,
in which the correction information includes information indicating each of a width and a thickness of the breast in the compression state and a pressure for compressing the breast, and
the processor is configured to derive the deflection angle from the correction information.

Supplementary Note 30

The image processing apparatus according to any one of Supplementary Notes 15 to 29,
in which the compression member has a fixed end on one side, and
the ultrasound image is obtained by causing the probe to perform scanning in a direction intersecting a line connecting the fixed end and a free end opposite to the fixed end.

Supplementary Note 31

The image processing apparatus according to any one of Supplementary Notes 15 to 30,
in which the radiation image to be associated with the corrected ultrasound image by the processor is not subjected to correction based on the correction information.

Supplementary Note 32

An image processing method executed by a computer, the method comprising:
acquiring a plurality of ultrasound images of a breast imaged in a compression state by a compression member;
acquiring correction information related to at least one of a tilt of a probe that has performed scanning on the compression member during the capturing of the plurality of ultrasound images or a deflection of the compression member;
generating a corrected ultrasound image corrected based on the correction information from the plurality of acquired ultrasound images;
acquiring a radiation image of the breast through imaging;
determining whether or not a compression state of the breast in the radiation image is considered to be the same as the compression state of the breast in the capturing of the plurality of ultrasound images; and
associating the corrected ultrasound image with the radiation image in a case in which determination is made that the compression states of the breast are considered to be the same.

Supplementary Note 33

An image processing program for causing a computer to execute:
acquiring a plurality of ultrasound images of a breast imaged in a compression state by a compression member;
acquiring correction information related to at least one of a tilt of a probe that has performed scanning on the compression member during the capturing of the plurality of ultrasound images or a deflection of the compression member;
generating a corrected ultrasound image corrected based on the correction information from the plurality of acquired ultrasound images;
acquiring a radiation image of the breast through imaging;
determining whether or not a compression state of the breast in the radiation image is considered to be the same as the compression state of the breast in the capturing of the plurality of ultrasound images; and
associating the corrected ultrasound image with the radiation image in a case in which determination is made that the compression states of the breast are considered to be the same.

Supplementary Note 34

An image processing apparatus comprising at least one processor,
in which the processor is configured to:
acquire a reference radiation image and a plurality of continuously captured ultrasound images while a breast is kept in a compression state by a compression member;
acquire correction information related to at least one of a tilt of a probe that has performed scanning on the compression member during the capturing of the plurality of ultrasound images or a deflection of the compression member;
generate a corrected ultrasound image corrected based on the correction information from the plurality of acquired ultrasound images;
acquire a radiation image of the breast through imaging; and
determine whether or not to associate the corrected ultrasound image with the radiation image based on a degree of similarity between the reference radiation image and the radiation image.

Supplementary Note 35

The image processing apparatus according to Supplementary Note 34,
in which the processor is configured to associate the corrected ultrasound image with the radiation image in a case in which the degree of similarity between the reference radiation image and the radiation image satisfies a predetermined criterion.

Supplementary Note 36

The image processing apparatus according to Supplementary Note 35,
in which the predetermined criterion is a criterion for considering that compression states of the breast in the imaging are the same.

Supplementary Note 37

The image processing apparatus according to any one of Supplementary Notes 34 to 36,
in which the processor is configured to acquire a detection result of a sensor that detects at least one of the tilt of the probe or the deflection of the compression member as the correction information.

Supplementary Note 38

The image processing apparatus according to Supplementary Note 37,
in which the sensor is a sensor provided on the probe for detecting the tilt of the probe.

Supplementary Note 39

The image processing apparatus according to Supplementary Note 38,
in which the sensor is any of a magnetic sensor, a gyro sensor, or an acceleration sensor.

Supplementary Note 40

The image processing apparatus according to Supplementary Note 37,
in which the sensor is a sensor that detects a distance between the compression member and a predetermined position.

Supplementary Note 41

The image processing apparatus according to Supplementary Note 40,
in which the sensor is at least one of a TOF camera, a 3D camera, or a laser distance measurement device.

Supplementary Note 42

The image processing apparatus according to Supplementary Note 34,
in which the correction information includes a thickness and a width of the breast in the compression state and a pressure for compressing the breast, and
the processor is configured to generate the corrected ultrasound image from the plurality of ultrasound images corrected based on the deflection of the compression member specified based on correspondence relationship information indicating a correspondence relationship among the width or the width and the thickness of the breast in the compression state, the pressure for compressing the breast, and information indicating the deflection of the compression member.

Supplementary Note 43

The image processing apparatus according to any one of Supplementary Notes 34 to 42,
in which the processor is configured to correct coordinates of each of the plurality of ultrasound images based on the correction information, and then generate a three-dimensional ultrasound image as the corrected ultrasound image through reconstruction.

Supplementary Note 44

The image processing apparatus according to Supplementary Note 43,
in which the processor is configured to perform affine transformation on each of the plurality of ultrasound images based on a deflection angle of the compression member at an imaging position of each of the plurality of ultrasound images, the deflection angle being obtained based on the correction information.

Supplementary Note 45

The image processing apparatus according to Supplementary Note 44,
in which the correction information includes information indicating each of a width and a thickness of the breast in the compression state and a pressure for compressing the breast, and
the processor is configured to derive the deflection angle from the correction information.

Supplementary Note 46

The image processing apparatus according to any one of Supplementary Notes 34 to 45,
in which the compression member has a fixed end on one side, and
the ultrasound image is obtained by causing the probe to perform scanning in a direction intersecting a line connecting the fixed end and a free end opposite to the fixed end.

Supplementary Note 47

The image processing apparatus according to Supplementary Note 34,
in which the radiation image that the processor determines whether or not to associate with the corrected ultrasound image is not subjected to correction based on the correction information.

Supplementary Note 48

An image processing method executed by a computer, the method comprising:
acquiring a reference radiation image and a plurality of continuously captured ultrasound images while a breast is kept in a compression state by a compression member;
acquiring correction information related to at least one of a tilt of a probe that has performed scanning on the compression member during the capturing of the plurality of ultrasound images or a deflection of the compression member;
generating a corrected ultrasound image corrected based on the correction information from the plurality of acquired ultrasound images;
acquiring a radiation image of the breast through imaging; and
determining whether or not to associate the corrected ultrasound image with the radiation image based on a degree of similarity between the reference radiation image and the radiation image.

Supplementary Note 49

An image processing program for causing a computer to execute:
acquiring a reference radiation image and a plurality of continuously captured ultrasound images while a breast is kept in a compression state by a compression member;
acquiring correction information related to at least one of a tilt of a probe that has performed scanning on the compression member during the capturing of the plurality of ultrasound images or a deflection of the compression member;
generating a corrected ultrasound image corrected based on the correction information from the plurality of acquired ultrasound images;
acquiring a radiation image of the breast through imaging; and
determining whether or not to associate the corrected ultrasound image with the radiation image based on a degree of similarity between the reference radiation image and the radiation image.

Supplementary Note 50

An image capturing system comprising:
the image processing apparatus according to any one of Supplementary Notes 1 to 12, any one of Supplementary Notes 15 to 31, or any one of Supplementary Notes 34 to 47;
a radiography apparatus; and
an ultrasonography apparatus.

What is claimed is:

1. An image processing apparatus comprising at least one processor,
wherein the processor is configured to:
acquire a radiation image and a plurality of continuously captured ultrasound images while a breast is kept in a compression state by a compression member and an imaging table;
acquire correction information related to at least one of a tilt of a probe that has performed scanning on the compression member during the capturing of the plurality of ultrasound images or a deflection of the compression member;
generate a corrected ultrasound image by correcting the plurality of acquired ultrasound images based on the correction information; and
associate the corrected ultrasound image with the radiation image by identifying a first coordinate in the corrected ultrasound image and a corresponding second coordinate in the radiation image,
wherein the first coordinate and the second coordinate are coordinates in an imaging surface on the imaging table.

2. The image processing apparatus according to claim 1, wherein the processor is configured to acquire a detection result of a sensor that detects at least one of the tilt of the probe or the deflection of the compression member as the correction information.

3. The image processing apparatus according to claim 2, wherein the sensor is a sensor provided on the probe for detecting the tilt of the probe.

4. The image processing apparatus according to claim 3, wherein the sensor is any of a magnetic sensor, a gyro sensor, or an acceleration sensor.

5. The image processing apparatus according to claim 2, wherein the sensor is a sensor that detects a distance between the compression member and a predetermined position.

6. The image processing apparatus according to claim 5, wherein the sensor is at least one of a TOF camera, a 3D camera, or a laser distance measurement device.

7. The image processing apparatus according to claim 1, wherein the correction information includes a thickness and a width of the breast in the compression state and a pressure for compressing the breast, and
the processor is configured to generate the corrected ultrasound image from the plurality of ultrasound images corrected based on the deflection of the compression member specified based on correspondence relationship information indicating a correspondence relationship among the width or the width and the thickness of the breast in the compression state, the pressure for compressing the breast, and information indicating the deflection of the compression member.

8. The image processing apparatus according to claim 1, wherein the processor is configured to correct coordinates of each of the plurality of ultrasound images based on the correction information, and then generate a three-dimensional ultrasound image as the corrected ultrasound image through reconstruction.

9. The image processing apparatus according to claim 8, wherein the processor is configured to perform affine transformation on each of the plurality of ultrasound images based on a deflection angle of the compression member at an imaging position of each of the plurality of ultrasound images, the deflection angle being obtained based on the correction information.

10. The image processing apparatus according to claim 9, wherein the correction information includes information indicating each of a width and a thickness of the breast in the compression state and a pressure for compressing the breast, and
the processor is configured to derive the deflection angle from the correction information.

11. The image processing apparatus according to claim 1, wherein the compression member has a fixed end on one side, and
the ultrasound image is obtained by causing the probe to perform scanning in a direction intersecting a line connecting the fixed end and a free end opposite to the fixed end.

12. The image processing apparatus according to claim 1, wherein the radiation image to be associated with the corrected ultrasound image by the processor is not subjected to correction based on the correction information.

13. An image processing method executed by a computer, the method comprising:
acquiring a radiation image and a plurality of continuously captured ultrasound images while a breast is kept in a compression state by a compression member and an imaging table;
acquiring correction information related to at least one of a tilt of a probe that has performed scanning on the compression member during the capturing of the plurality of ultrasound images or a deflection of the compression member;
generating a corrected ultrasound image by correcting the plurality of acquired ultrasound images based on the correction information; and
associating the corrected ultrasound image with the radiation image by identifying a first coordinate in the corrected ultrasound image and a corresponding second coordinate in the radiation image,
wherein the first coordinate and the second coordinate are coordinates in an imaging surface on the imaging table.

14. A non-transitory storage medium storing an image processing program for causing a computer to execute image processing, the image processing comprising:
acquiring a radiation image and a plurality of continuously captured ultrasound images while a breast is kept in a compression state by a compression member and an imaging table;
acquiring correction information related to at least one of a tilt of a probe that has performed scanning on the compression member during the capturing of the plurality of ultrasound images or a deflection of the compression member;
generating a corrected ultrasound image by correcting the plurality of acquired ultrasound images based on the correction information; and
associating the corrected ultrasound image with the radiation image by identifying a first coordinate in the corrected ultrasound image and a corresponding second coordinate in the radiation image,
wherein the first coordinate and the second coordinate are coordinates in an imaging surface on the imaging table.

15. An image capturing system comprising:
the image processing apparatus according to claim 1;
a radiography apparatus; and
an ultrasonography apparatus.

* * * * *